United States Patent
Hansen et al.

(12) 
(10) Patent No.: US 6,234,634 B1
(45) Date of Patent: May 22, 2001

(54) IMAGE PROJECTION SYSTEM WITH A POLARIZING BEAM SPLITTER

(75) Inventors: Douglas P. Hansen, Spanish Fork; Raymond T. Perkins, Orem; Eric Gardner, Provo; Mark W. Lund, Orem, all of UT (US)

(73) Assignee: Moxtek, Orem, UT (US)

( * ) Notice: Subject to any disclaimer, the term of this patent is extended or adjusted under 35 U.S.C. 154(b) by 0 days.

(21) Appl. No.: 09/363,256

(22) Filed: Jul. 28, 1999

(51) Int. Cl.[7] ............................................ G03B 21/14
(52) U.S. Cl. ............................................... 353/20
(58) Field of Search ........................... 353/20, 122, 31, 353/33, 34, 37; 349/8, 9; 359/486

(56) References Cited

U.S. PATENT DOCUMENTS

| | | |
|---|---|---|
| 2,224,214 | 12/1940 | Brown . |
| 2,287,598 | 6/1942 | Brown . |
| 2,748,659 | 6/1956 | Geffcken et al. . |
| 2,887,566 | 5/1959 | Marks . |
| 3,046,839 | 7/1962 | Bird et al. . |
| 3,436,143 | 4/1969 | Garrett . |
| 3,479,168 | 11/1969 | Bird et al. . |
| 3,536,373 | 10/1970 | Bird et al. . |
| 3,566,099 | 2/1971 | Makas . |
| 3,631,288 | 12/1971 | Rogers . |
| 3,857,627 | 12/1974 | Harsch . |
| 3,876,285 | 4/1975 | Schwarzmüller . |
| 3,912,369 | 10/1975 | Kashnow . |
| 3,969,545 | 7/1976 | Slocum . |
| 4,009,933 | 3/1977 | Firester . |
| 4,025,164 | 5/1977 | Doriguzzi et al. . |
| 4,025,688 | 5/1977 | Nagy et al. . |
| 4,049,944 | 9/1977 | Garvin et al. . |
| 4,073,571 | 2/1978 | Grinberg et al. . |
| 4,181,756 | 1/1980 | Fergason . |

(List continued on next page.)

FOREIGN PATENT DOCUMENTS

| | | |
|---|---|---|
| 416157 | 7/1925 | (DE) . |
| 296391 | 2/1950 | (DE) . |
| 3707984A1 | 3/1987 | (DE) . |
| 0317910A1 | 11/1987 | (EP) . |

(List continued on next page.)

OTHER PUBLICATIONS

Lloyd William Taylor Manual of Advanced Undergraduate Experiments in Physics, p. 302 (1959).

Flanders, Application of ≈ 100 Å linewidth structures fabricated by shadowing techniques[a], J. Vac. Sci. Technol., 19(4), Nov./Dec. 1981.

Kuta and van Driel, "Coupled–wave analysis of lamellar metal transmission gratings for the visible and the infrared," J. Opt. Soc. Am. A/vol. 12, No. 5/May 1995.

Lockbihler and Depine, "Diffraction from highly conducting wire gratings of arbitrary cross–section," Journal of Modern Optics, 1993, vol. 40, No. 7, pp. 1273–1298.

(List continued on next page.)

*Primary Examiner*—William Dowling
(74) *Attorney, Agent, or Firm*—Thorpe North & Western LLP

(57) ABSTRACT

An image projection system has a wire grid polarizing beam splitter which functions as both the polarizer and the analyzer in the system. A light source produces a source light beam directed at the beam splitter which reflects one polarization and transmits the other. A liquid crystal array is disposed in either the reflected or transmitted beam. The array modulates the polarization of the beam, encoding image information thereon, and directs the modulated beam back to the beam splitter. The beam splitter again reflects one polarization and transmits the other so that the encoded image is either reflected or transmitted to a screen. The wire grid polarizing beam splitter is capable of being oriented at various incident angles with respect to the source light beam and modulated beam, and accepts relatively divergent light.

32 Claims, 13 Drawing Sheets

U.S. PATENT DOCUMENTS

| | | |
|---|---|---|
| 4,220,705 | 9/1980 | Sugibuchi et al. . |
| 4,221,464 | 9/1980 | Pedinoff et al. . |
| 4,268,127 | 5/1981 | Oshima et al. . |
| 4,289,381 | 9/1981 | Garvin et al. . |
| 4,456,515 | 6/1984 | Krueger et al. . |
| 4,466,704 | 8/1984 | Schuler et al. . |
| 4,512,638 | 4/1985 | Sriram et al. . |
| 4,514,479 | 4/1985 | Ferrante . |
| 4,515,441 | 5/1985 | Wentz . |
| 4,688,897 | 8/1987 | Grinberg et al. . |
| 4,711,530 | 12/1987 | Nakanowatari et al. . |
| 4,743,092 | 5/1988 | Pistor . |
| 4,759,611 | 7/1988 | Downey, Jr. . |
| 4,759,612 | 7/1988 | Nakatsuka et al. . |
| 4,799,776 | 1/1989 | Yamazaki et al. . |
| 4,818,076 | 4/1989 | Heppke et al. . |
| 4,865,670 | 9/1989 | Marks . |
| 4,895,769 | 1/1990 | Land et al. . |
| 4,913,529 | 4/1990 | Goldenberg et al. . |
| 4,946,231 | 8/1990 | Pistor . |
| 4,966,438 | 10/1990 | Mouchart et al. . |
| 4,991,937 | 2/1991 | Urino . |
| 5,029,988 | 7/1991 | Urino . |
| 5,061,050 | 10/1991 | Ogura . |
| 5,087,985 | 2/1992 | Kitaura et al. . |
| 5,113,285 | 5/1992 | Franklin et al. . |
| 5,122,887 | 6/1992 | Mathewson . |
| 5,122,907 | 6/1992 | Slocum . |
| 5,139,340 | 8/1992 | Okumura . |
| 5,157,526 | 10/1992 | Kondo et al. . |
| 5,177,635 | 1/1993 | Keilmann . |
| 5,225,920 | 7/1993 | Kasazumi et al. . |
| 5,235,443 | 8/1993 | Barnik et al. . |
| 5,235,449 | 8/1993 | Imazeki et al. . |
| 5,239,322 | 8/1993 | Takanashi et al. . |
| 5,245,471 | 9/1993 | Iwatsuka et al. . |
| 5,295,009 | 3/1994 | Barnik et al. . |
| 5,305,143 | 4/1994 | Taga et al. . |
| 5,325,218 | 6/1994 | Willett et al. . |
| 5,333,072 | 7/1994 | Willett . |
| 5,357,370 | 10/1994 | Miyatake et al. . |
| 5,383,053 | 1/1995 | Hegg et al. . |
| 5,422,756 | 6/1995 | Weber . |
| 5,436,761 | 7/1995 | Kamon . |
| 5,486,935 | 1/1996 | Kalmanash . |
| 5,486,949 | 1/1996 | Schrenk et al. . |
| 5,490,003 | 2/1996 | Van Sprang . |
| 5,506,704 | 4/1996 | Broer et al. . |
| 5,508,830 | 4/1996 | Imoto et al. . |
| 5,513,023 | 4/1996 | Fritz et al. . |
| 5,513,035 | 4/1996 | Miyatake et al. . |
| 5,517,356 | 5/1996 | Araujo et al. . |
| 5,557,343 | 9/1996 | Yamagishi . |
| 5,559,634 | 9/1996 | Weber . |
| 5,570,215 | 10/1996 | Omae et al. . |
| 5,574,580 | 11/1996 | Ansley . |
| 5,579,138 | 11/1996 | Sannohe et al. . |
| 5,594,561 | 1/1997 | Blanchard . |
| 5,612,820 | 3/1997 | Schrenk et al. . |
| 5,619,356 | 4/1997 | Kozo et al. . |
| 5,626,408 | 5/1997 | Heynderickx et al. . |
| 5,748,368 | 5/1998 | Tamada et al. . |
| 5,748,369 | 5/1998 | Yokota . |
| 5,833,360 | 11/1998 | Knox et al. . |
| 6,082,861 * | 7/2000 | Dove et al. .............. 353/20 |
| 6,108,131 * | 8/2000 | Hansen et al. ........... 359/486 |

FOREIGN PATENT DOCUMENTS

| | | |
|---|---|---|
| 0349144B1 | 6/1988 | (EP) . |
| 0349309B1 | 6/1988 | (EP) . |
| 0336334B1 | 8/1988 | (EP) . |
| 0357946B1 | 8/1988 | (EP) . |
| 0407830A2 | 7/1989 | (EP) . |
| 0407830B1 | 7/1989 | (EP) . |
| 0416157A1 | 9/1989 | (EP) . |
| 0488544A1 | 11/1990 | (EP) . |
| 0507445A2 | 3/1991 | (EP) . |
| 0518111A1 | 5/1991 | (EP) . |
| 0588937B1 | 6/1991 | (EP) . |
| 0521591B1 | 7/1991 | (EP) . |
| 0543061A1 | 11/1991 | (EP) . |
| 0606940A2 | 1/1993 | (EP) . |
| 0634674A2 | 6/1993 | (EP) . |
| 0670506A1 | 9/1993 | (EP) . |
| 0744634A2 | 5/1996 | (EP) . |
| 0084502 | 8/1989 | (JP) . |
| 1781659A1 | 10/1990 | (SU) . |

OTHER PUBLICATIONS

Novak et al., "Far infrared polarizing grids for use at cryogenic temperatures," Applied Optics, Aug. 15, 1989/vol. 28, No. 15, pp. 3425–3427.

Auton and Hutley, "Grid Polarizers for Use in the Near Infrared," Infrared Physics, 1972, vol. 12, pp. 95–100.

Stenkamp et al, "Grid polarizer for the visible spectral region," SPIE vol. 2213 pp. 288–296.

Handbook of Optics, 1978, pp. 10–68 –10–77.

Handbook of Optics vol. II, $2^{nd}$ Edition, pp. 3.32–3.35.

Glytsis and Gaylord, "High–spatial–frequency binary and multilevel stairstep gratings: polarization–selective mirrors and broadband antireflection surfaces," Applied Optics Aug. 1, 1992, vol. 31, No. 22 pp. 4459–4470.

Auton, "Infrared Transmission Polarizers by Photolithography," Applied Optics Jun. 1967 vol. 6, No. 6, pp. 1023–1027.

Haggans et al., "Lamellar gratings as polarization components for specularly reflected beams," Journal of Modern Optics, 1993, vol. 40, No. 4, pp. 675–686.

Bird and Parrish, Jr., "The Wire Grid as a Near–Infrared Polarizer," Lasers in Industry, pp. 886–891 (1972).

Optics $9^{th}$ Edition, pp. 338–339 (1980).

Whitbourn and Douglas, "Phase shifts in transmission line models of thin periodic metal grids," Applied Optics Aug. 15, 1989 vol. 28, No. 15, pp. 3511–3515.

Enger and Case, "Optical elements with ultrahigh spatial-frequency surface corrugations," Applied Optics Oct. 15, 1983, vol. 22, No. 20 pp. 3220–3228.

Knop, "Reflection Grating Polarizer for the Infrared," Optics Communications vol. 26, No. 3, Sep. 1978.

Hass and O'Hara, "Sheet Infrared Transmission Polarizers," Applied Optics Aug. 1965, vol. 4, No. 8 pp. 1027–1031.

Flanders, "Submicron periodicity gratins as artificial anisotropic dielectrics," Apr. Phys. Lett. 42 (6), Mar. 15, 1983, pp. 492–494.

Li Li and J.A. Dobrowski, "Visible broadband, wide–angle, thin–film multilayer polarizing beam splitter," Applied Optics May 1, 1996, vol. 35, No. 13, pp. 2221–2224.

Sonek et al., "Ultraviolet grating polarizers," J. Vac. Sci. Technol., 19(4), Nov./Dec. 1981, pp. 921–923.

* cited by examiner

IMAGE PROJECTION SYSTEM WITH A POLARIZING BEAM SPLITTER

BACKGROUND OF THE INVENTION

1. Field of the Invention

The present invention relates to an image projection system operable within the visible spectrum which includes a polarizing beam splitter which reflects one linear polarization of light and transmits the other. More particularly, the present invention relates to such an image projection system with a compact, lightweight beam splitter that is comprised of a plurality of elongated, reflective elements for interacting with the electromagnetic waves of the source light to generally transmit or pass one polarization of light, and reflect the other polarization.

2. Prior Art

Polarized light is necessary in certain applications, such as projection liquid crystal displays (LCD). Such a display is typically comprised of a light source; optical elements, such as lenses to gather and focus the light; a polarizer that transmits one polarization of the light to the liquid crystal array; a liquid crystal array for manipulating the polarization of the light to encode image information thereon; means for addressing each pixel of the array to either change or retain the polarization; a second polarizer (called an analyzer) to reject the unwanted light from the selected pixels; and a screen upon which the image is focused.

It is possible to use a single polarizing beam splitter (PBS) to serve both as the first polarizer and the second polarizer (analyzer). If the liquid crystal array is reflective, for example a Liquid Crystal On Silicon (LCOS) light valve, it can reflect the beam that comes from the polarizer directly back to the polarizer after encoding the image by modifying the polarization of selected pixels. Such a system was envisioned by Takanashi (U.S. Pat. No. 5,239,322). The concept was elaborated by Fritz and Gold (U.S. Pat. No. 5,513,023). These similar approaches would provide important advantages in optical layout and performance. Neither, however, has been realized in practice because of deficiencies in conventional polarizing beam splitters. The disadvantages of using conventional polarizing beam splitters in projection liquid crystal displays includes images that are not bright, have poor contrast, and have non-uniform color balance or non-uniform intensity (due to non-uniform performance over the light cone). In addition, many conventional polarizing beam splitters are short-lived because of excessive heating, and are very expensive.

In order for such an image projection system to be commercially successful, it must deliver images which are significantly better than the images provided by conventional cathode ray tube (CRT) television displays because it is likely that such a system will be more expensive than conventional CRT technology. Therefore, the image projection system must provide (1) bright images with the appropriate colors or color balance; (2) have good image contrast; and (3) be as inexpensive as possible. An improved polarizing beam splitter (PBS) is an important part of achieving this goal because the PBS is a limiting component which determines the potential performance of the display system.

The PBS characteristics which significantly affect the display performance are (1) the angular aperture, or the f-number, at which the polarizer can function; (2) the absorption, or energy losses, associated with the use of the PBS; and (3) the durability of the PBS. In optics, the angular aperture or f-number describes the angle of the light cone which the PBS can use and maintain the desired performance level. Larger cones, or smaller f-numbers, are desired because the larger cones allow for more light to be gathered from the light source, which leads to greater energy efficiency and more compact systems.

The absorption and energy losses associated with the use of the PBS obviously affect the brightness of the system since the more light lost in the optics, the less light remains which can be projected to the view screen. In addition, the amount of light energy which is absorbed by the polarizer will affect its durability, especially in such image projection systems in which the light passing through the optical system is very intense, on the order of watts per square centimeter. Light this intense can easily damage common polarizers, such as Polaroid sheets. In fact, the issue of durability limits the polarizers which can be used in these applications.

Durability is also important because the smaller and lighter the projection system can be made, the less expensive and more desirable is the product. To accomplish this goal, however, the light intensity must be raised even higher, further stressing the PBS, and shortening its useful life.

A problematic disadvantage of conventional PBS devices is poor conversion efficiency, which is the primary critical performance factor in displays. Conversion efficiency is a measure describing how much of the electrical power required by the light source is translated into light intensity power on the screen or panel that is observed by people viewing it. It is expressed as the ratio of total light power on the screen divided by the electrical power required by the light source. The conventional units are lumens per watt. A high ratio is desirable for a number of reasons. For example, a low conversion efficiency will require a brighter light source, with its accompanying larger power supply, excess heat, larger enclosures and cabinet, etc. In addition, all of these consequences of low conversion efficiency raise the cost of the projection system.

A fundamental cause of low conversion efficiency is poor optical efficiency, which is directly related to the f-number of the optical system. A system which has an f-number which is half the f-number of an otherwise equivalent system has the potential to be four times as efficient in gathering light from the light source. Therefore, it is desirable to provide an improved polarizing beam splitter (PBS) which allows more efficient harvesting of light energy by offering a significantly smaller potential f-number (larger angular aperture), and therefore increases the conversion efficiency, as measured in lumens/watt.

There are several reasons for the poor performance of conventional polarizing beam splitters with respect to conversion efficiency when they are used as beam splitters in projection systems. First, current beam splitters work poorly if the light does not strike them at a certain angle (or at least, within a narrow cone of angles about this principal angle of incidence). Deviation of the principal ray from this angle causes each type of polarizing beam splitter to degrade the intensity, the purity of polarization, and/or the color balance. This applies to the beam coming from the light source as well as to the beam reflected from the liquid crystal array. This principal angle depends upon the design and construction of the PBS as well as the physics of the polarization mechanism employed in these various beam splitters. Currently available polarizing beam splitters are not capable of operating efficiently at angles far from their principal polarizing angles in the visible portion of the electromagnetic spectrum. This restriction makes it impossible to implement certain promising optical layouts and commercially promising display designs.

Even if the principal ray strikes the polarizer at the best angle for separating the two polarizations, the other rays cannot diverge far from this angle or their visual qualities will be degraded. This is a serious deficiency in a display apparatus because the light striking the polarizer must be strongly convergent or divergent to make efficient use of the light emitted by typical light sources. This is usually expressed as the f-number of the optical system. For a single lens, the f-number is the ratio of the aperture to the focal length. For optical elements in general, the F-number is defined as $$F/\# = 1/(2 n \sin \theta)$$

where n is the refractive index of the space within which the optical element is located, and $\theta$ is the half cone angle. The smaller the F-number, the greater the radiant flux, $\phi_c$, collected by the lens, and the more efficient the device will be for displaying a bright image. The radiant flux increases as the inverse square of the F/#. In an optical train, the optical element with the largest F/# will be the limiting factor in its optical efficiency. For displays using traditional polarizers, the limiting element is nearly always the polarizer, and thus the PBS limits the conversion efficiency. It would clearly be beneficial to develop a type of PBS that has a smaller F/# than any that are currently available.

Because traditional polarizers with small F/#s have not been available, designers typically have addressed the issue of conversion efficiency by specifying a smaller, brighter light source. Such sources, typically arc lamps, are available, but they require expensive power supplies that are heavy, bulky, and need constant cooling while in operation. Cooling fans cause unwanted noise and vibration. These features are detrimental to the utility of projectors and similar displays. Again, a PBS with a small F/# would enable efficient gathering of light from low-power, quiet, conventional light sources.

Another key disadvantage of conventional polarizing beam splitters is a low extinction, which results in poor contrast in the image. Extinction is the ratio of the light transmitted through the polarizer of the desired polarization to the light rejected of the undesired polarization. In an efficient display, this ratio must be maintained at a minimum value over the entire cone of light passing through the PBS. Therefore, it is desirable to provide a polarizing beam splitter which has a high extinction ratio resulting in a high contrast image.

A third disadvantage of conventional polarizing beam splitters is a non-uniform response over the visible spectrum, or poor color fidelity. The result is poor color balance which leads to further inefficiency in the projection display system as some light from the bright colors must be thrown away to accommodate the weaknesses in the polarizing beam splitter. Therefore, it is desirable to provide an improved polarizing beam splitter that has a uniform response over the visible spectrum, (or good color fidelity) giving an image with good color balance with better efficiency. The beam splitter must be achromatic rather than distort the projected color, and it must not allow crosstalk between the polarizations because this degrades image acuity and contrast. These characteristics must apply over all portions of the polarizer and over all angles of light incidence occurring at the polarizer. The term spathic has been coined (R. C. Jones, Jour. Optical Soc. Amer. 39, 1058, 1949) to describe a polarizer that conserves cross-sectional area, solid angle, and the relative intensity distribution of wavelengths in the polarized beam. A PBS that serves as both a polarizer and analyzer must be spathic for both transmission and reflection, even in light beams of large angular aperture.

A fourth disadvantage of conventional polarizing beam splitters is poor durability. Many conventional polarizing beam splitters are subject to deterioration caused by excessive heating and photochemical reactions. Therefore, it is desirable to provide an improved polarizing beam splitter that can withstand an intense photon flux for thousands of hours without showing signs of deterioration. In addition, it is desirable to provide a polarizing beam splitter that is amenable to economical large scale fabrication.

The need to meet these, and other, criteria has resulted in only a few types of polarizers finding actual use in a projection system. Many attempts have been made to incorporate both wide angular aperture and high fidelity polarization into the same beam splitting device. The relative success of these efforts is described below. Thin film interference filters are the type of polarizer cited most frequently in efforts to make a polarizing beam splitter that is also used as an analyzer. MacNeille was the first to describe such a polarizer that was effective over a wide spectral range (U.S. Pat. No. 2,403,731). It is composed of thin-film multi-layers set diagonally to the incident light, typically within a glass cube, so it is bulky and heavy compared to a sheet polarizer. What is more, it must be designed for a single angle of incidence, usually 45°, and its performance is poor if light is incident at angles different from this by even as little as 2°. Others have improved on the design (e.g. J. Mouchart, J. Begel, and E. Duda, Applied Optics 28, 2847–2853, 1989; and L. Li and J. A. Dobrowolski, Applied Optics 13, 2221–2225, 1996). All of them found it necessary to seriously reduce the wavelength range if the angular aperture is to be increased. This can be done in certain designs (U.S. Pat. Nos. 5,658,060 and 5,798,819) in which the optical design divides the light into appropriate color bands before it arrives at the polarizing beam splitter. In this way, it is possible to reduce the spectral bandwidth demands on the beam splitter and expand its angular aperture, but the additional components and complexity add significant cost, bulk, and weight to the system.

Even so, these improved beam splitter cubes are appearing on the market, and are currently available from well known vendors such as Balzers and OCLI. They typically offer an F/# of f/2.5–f/2.8, which is a significant improvement over what was available 2 years ago, but is still far from the range of F/1.2–F/2.0 which is certainly within reach of the other key components in optical projection systems. Reaching these f-numbers has the potential to improve system efficiency by as much as a factor of 4. They would also enable the projection display engineer to make previously impossible design trade-offs to achieve other goals, such as reduced physical size and weight, lower cost, etc.

In a technology far from visible optics, namely radar, wire grids have been used successfully to polarize long wavelength radar waves. These wire grid polarizers have also been used as reflectors. They are also well known as optical components in the infrared (IR), where they are used principally as transmissive polarizer elements.

Although it has not been demonstrated, some have postulated possible use of a wire grid polarizer in display applications in the visible portion of the spectrum. For example, Grinberg (U.S. Pat. No. 4,688,897) suggested that a wire grid polarizer serve as both a reflector and an electrode (but not simultaneously as an analyzer) for a liquid crystal display.

Others have posed the possible use of a wire grid polarizer in place of a dichroic polarizer to improve the efficiency of virtual image displays (see U.S. Pat. No. 5,383,053). The need for contrast or extinction in the grid polarizer, however, is explicitly dismissed, and the grid is basically used as a polarization sensitive beam steering device. It does not serve the purpose of either an analyzer, or a polarizer, in the U.S. Pat. No. 5,383,053. It is also clear from the text that a broadband polarizing cube beam splitter would have served the purpose as well, if one had been available. This technology, however, is dismissed as being too restricted in acceptance angle to even be functional, as well as prohibitively expensive.

Another patent (U.S. Pat. No. 4,679,910) describes the use of a grid polarizer in an imaging system designed for the testing of IR cameras and other IR instruments. In this case, the application requires a beam splitter for the long wavelength infra-red, in which case a grid polarizer is the only practical solution. The patent does not suggest utility for the visible range or even mention the need for a large angular aperture. Neither does it address the need for efficient conversion of light into a viewable image, nor the need for broadband performance.

Other patents also exist for wire-grid polarizers in the infrared portion of the spectrum (U.S. Pat. Nos. 4,514,479, 4,743,093; and 5,177,635, for example). Except for the exceptions just cited, the emphasis is solely on the transmission performance of the polarizer in the IR spectrum.

These references demonstrate that it has been known for many years that wire-grid arrays can function generally as polarizers. Nevertheless, they apparently have not been proposed and developed for image projection systems. One possible reason that wire grid polarizers have not been applied in the visible spectrum is the difficulty of manufacture. U.S. Pat. No. 4,514,479 teaches a method of holographic exposure of photoresist and subsequent etching in an ion mill to make a wire grid polarizer for the near infrared region; in U.S. Pat. No. 5,122,907, small, elongated ellipsoids of metal are embedded in a transparent matrix that is subsequently stretched to align their long axes of the metal ellipsoids to some degree. Although the transmitted beam is polarized, the device does not reflect well. Furthermore, the ellipsoid particles have not been made small enough to be useful in the visible part of the electromagnetic spectrum. Accordingly, practical applications have been generally limited to the longer wavelengths of the IR spectrum.

Another prior art polarizer achieves much finer lines by grazing angle evaporative deposition (U.S. Pat. No. 4,456,515). Unfortunately, the lines have such small cross sections that the interaction with the visible light is weak, and so the optical efficiency is too poor for use in the production of images. As in several of these prior art efforts, this device has wires with shapes and spacings that are largely random. Such randomness degrades performance because regions of closely spaced elements do not transmit well, and regions of widely spaced elements have poor reflectance. The resulting degree of polarization (extinction) is less than maximal if either or both of these effects occur, as they surely must if placement has some randomness to it.

For perfect (and near perfect) regularity, the mathematics developed for gratings apply well. Conversely, for random wires (even if they all have the same orientation) the theory of scattering provides the best description. Scattering from a single cylindrical wire has been described (H. C. Van de Hulst, Light Scattering by Small Particles, Dover, 1981). The current random-wire grids have wires embedded throughout the substrate. Not only are the positions of the wires somewhat random, but the diameters are as well. It is clear that the phases of the scattered rays will be random, so the reflection will not be strictly specular and the transmission will not retain high spacial or image fidelity. Such degradation of the light beam would prevent its use for transfer of well resolved, high-information density images.

Nothing in the prior art indicates or suggests that an ordered array of wires can or should be made to operate over the entire visible range as a spathic PBS, at least at the angles required when it serves both as a polarizer and analyzer. Indeed, the difficulty of making the narrow, tall, evenly spaced wires that are required for such operation has been generously noted (see Zeitner, et. al. Applied Optics, 38, 11 pp. 2177–2181 (1999), and Schnabel, et. al., Optical Engineering 38,2 pp. 220–226 (1999)). Therefore, it is not surprising that the prior art for image projection similarly makes no suggestion for use of a spathic PBS as part of a display device.

Tamada and Matsumoto (U.S. Pat. No. 5,748,368) disclose a wire grid polarizer that operates in both the infrared and a portion of the visible spectrum; however, it is based on the concept that large, widely spaced wires will create resonance and polarization at an unexpectedly short wavelength in the visible. Unfortunately, this device works well only over a narrow band of visible wavelengths, and not over the entire visible spectrum. It is therefore not suitable for use in producing images in full color. Accordingly, such a device is not practical for image display because a polarizer must be substantially achromatic for an image projection system.

Another reason wire grid polarizers have been overlooked is the common and long standing belief that the performance of a typical wire grid polarizer becomes degraded as the light beam's angle of incidence becomes large (G. R. Bird and M. Parrish, Jr., "The Wire Grid as a Near-Infrared Polarizer," J. Opt. Soc. Am., 50, pp. 886–891, (1960); the Handbook of Optics, Michael Bass, Volume II, p. 3–34, McGraw-Hill (1995)). There are no reports of designs that operate well for angles beyond 35° incidence in the visible portion of the spectrum. Nor has anyone identified the important design factors that cause this limitation of incidence angle. This perceived design limitation becomes even greater when one realizes that a successful beam splitter will require suitable performance in both transmission and reflection simultaneously.

This important point deserves emphasis. The extant literature and patent history for wire grid polarizers in the IR and the visible spectra has almost entirely focused on their use as transmission polarizers, and not on reflective properties. Wire grid polarizers have been attempted and reported in the technical literature for decades, and have become increasingly common since the 1960s. Despite the extensive work done in this field, there is very little, if any, detailed discussion of the production and use of wire grid polarizers as reflective polarizers, and nothing in the literature concerning their use as both transmissive and reflective polarizers simultaneously, as would be necessary in a spathic polarizing beam splitter for use in imaging devices. From the lack of discussion in the literature, a reasonable investigator would conclude that any potential use of wire grid polarizers as broadband visible beam splitters is riot apparent, or that it was commonly understood by the technical community that their use in such an application was not practical.

Because the conventional polarizers described above were the only ones available, it was impossible for Takanashi (U.S. Pat. No. 5,239,322) to reduce his projection device to practice with anything but the most meager results.

No polarizer was available which supplied the performance required for the Takanashi invention, namely, achromaticity over the visible part of the spectrum, wide angular acceptance, low losses in transmission and reflection of the desired light polarizations, and good extinction ratio.

There are several important features of an image display system which require specialized performance of transmission and reflection properties. For a projector, the product of p-polarization transmission and s-polarization reflection ($R_sT_p$) must be large if source light is to be efficiently placed on the screen. On the other hand, for the resolution and contrast needed to achieve high information density on the screen, it is important that the converse product ($R_pT_s$) be very small (i.e. the transmission of s-polarized light multiplied by the reflection of p-polarized light must be small).

Another important feature is a wide acceptance angle. The acceptance angle must be large if light gathering from the source, and hence the conversion efficiency, is maximized. It is desirable that cones of light (either diverging or converging) with half-angles greater than 20° be accepted.

An important consequence of the ability to accept larger light cones and work well at large angles is that the optical design of the imaging system is no longer restricted. Conventional light sources can be then be used, bringing their advantages of low cost, cool operation, small size, and low weight. A wide range of angles makes it possible for the designer to position the other optical elements in favorable positions to improve the size and operation of the display.

Another important feature is size and weight. The conventional technology requires the use of a glass cube. This cube imposes certain requirements and penalties on the system. The requirements imposed include the need to deal with thermal loading of this large piece of glass and the need for high quality materials without stress birefringence, etc., which impose additional cost. In addition, the extra weight and bulk of the cube itself poses difficulties. Thus, it is desirable that the beam splitter not occupy much volume and does not weigh very much.

Another important feature is robustness. Modern light sources generate very high thermal gradients in the polarizer immediately after the light is switched on. At best, this can induce thermal birefringence which causes cross talk between polarizations. What is more, the long duration of exposure to intense light causes some materials to change properties (typically yellowing from photo-oxidation). Thus, it is desirable for the beam splitter to withstand high temperatures as well as long periods of intense radiation from light sources.

Still another important feature is uniform extinction (or contrast) performance of the beam splitter over the incident cone of light. A McNeille-type thin film stack polarizer produces polarized light due to the difference in reflectivity of S-polarized light as opposed to P-polarized light. Since the definition of S and P polarization depends on the plane of incidence of the light ray, which changes orientation within the cone of light incident on the polarizer, a McNeille-type polarizer does not work equally well over the entire cone. This weakness in McNeille-type polarizers is well known. It must be addressed in projection system design by restricting the angular size of the cone of light, and by compensation elsewhere in the optical system through the use of additional optical components. This fundamental weakness of McNeille prisms raises the costs and complexities of current projection systems, and limits system performance through restrictions on the f-number or optical efficiency of the beam splitter.

Other important features include ease of alignment. Production costs and maintenance are both directly affected by assembly criteria. These costs can be significantly reduced with components which do not require low tolerance alignments.

Therefore, it would be advantageous to develop an image projection system capable of providing bright images and good image contrast, and which is inexpensive. It would also be advantageous to develop an image projection system with a polarizing beam splitter capable of utilizing divergent light (or having a smaller F/#), capable of efficient use of light energy or with high conversion efficiency, and which is durable. It would also be advantageous to develop an image projection system with a polarizing beam splitter having a high extinction ratio, uniform response over the visible spectrum, good color fidelity, that is spathic, robust and capable of resisting thermal gradients. It would also be advantageous to develop an image projection system with a polarizing beam splitter capable of being positioned at substantially any incidence angle so that significant design constraints are not imposed on the image projection system, but substantial design flexibility is permitted. It would also be advantageous to develop an image projection system with a polarizing beam splitter which efficiently transmits p-polarized light and reflects s-polarized light across all angles in the entire cone of incident light. It would also be advantageous to develop an image projection system with a polarizing beam splitter which is light-weight and compact. It would also be advantageous to develop an image projection system with a polarizing beam splitter which is easy to align. Combining all of these features in a single projection device would offer a significant advance within the state of the art.

OBJECTS AND SUMMARY OF THE INVENTION

It is therefore an object of the present invention to provide an image projection system which provides bright images with good image contrast, and which is inexpensive.

It is another object of the present invention to provide an image projection system with a polarizing beam splitter which utilizes divergent light (or has a smaller F/#), efficiently uses light energy, has good conversion efficiency, and is durable.

It is another object of the present invention to provide an image projection system with a polarizing beam splitter with a high extinction ratio, a uniform response over the visible spectrum, good color fidelity, which is spathic, robust and resists thermal gradients.

It is another object of the present invention to provide an image projection system with a polarizing beam splitter capable of selectively directing either or both of the transmitted and reflected polarized beams at substantially any angle.

It is yet another object of the present invention to provide an image projection system with a polarizing beam splitter which functions adequately while positioned with respect to the source light beam at substantially any incident angle.

It is yet another object of the present invention to provide an image projection system with a polarizing beam splitter which efficiently transmits p-polarized light and reflects s-polarized light over all angles within the cone of light, but can also function to transmit s-polarized light and reflect p-polarized light similarly.

It is yet another object of the present invention to provide an image projection system with a polarizing beam splitter which is light-weight, compact, robust, and easy to align.

It is a further object of the present invention to provide a polarizing beam splitter for use in image projection systems.

These and other objects and advantages of the present invention are realized in an image projection system with a polarizing beam splitter which advantageously is a wire grid polarizer. The wire grid polarizing beam splitter has a generally parallel arrangement of thin, elongated elements. The arrangement is configured, and the elements are sized, to interact with electromagnetic waves of the source light beam to generally transmit one polarization of light through the elements, and reflect the other polarization from the elements. Light having a polarization oriented perpendicular to a plane that includes at least one of the elements and the direction of the incident light beam is transmitted, and defines a transmitted beam. The opposite polarization, or light having a polarization oriented parallel with the plane that includes at least one of the elements and the direction of the incident light beam, is reflected, and defines a reflected beam.

The system includes a light source for producing a mostly unpolarized, visible light beam. The polarizing beam splitter is located proximal to the light source in the light beam. The system also includes a reflective liquid crystal array. The array may be located proximal to the polarizing beam splitter in either the reflected or transmitted beam. The array modulates the polarization of the beam, and creates a modulated beam. The array is oriented to direct the modulated beam back to the beam splitter. The arrangement of elements of the beam splitter interacts with electromagnetic waves of the modulated beam to again generally transmit one polarization and reflect the other polarization. Thus, the reflected portion of the modulated beam defines a second reflected beam, while the transmitted portion defines a second transmitted beam. The array alters the polarization of the beam to encode image information on the modulated beam. The beam splitter separates the modulated polarization from the unmodulated beam, thus making the image visible on a screen.

A screen is disposed in either the second reflected or second transmitted beam. If the array is disposed in the reflected beam, then the screen is disposed in the second transmitted beam. If the array is disposed in the transmitted beam, then the screen is disposed in the second reflected beam.

Unlike the bulky, heavy beam splitters of the prior art, the beam splitter of the present invention is a generally planar sheet. The beam splitter is also efficient, thus providing greater luminous efficacy of the system.

In accordance with one aspect of the present invention, the beam splitter is capable of being oriented with respect to the light beam and the modulated beam at incidence angles between approximately 0 to 80 degrees.

In accordance with another aspect of the present invention, the light beam has a useful divergent cone with a half angle between approximately 12 and 25°. The beam splitter is used at a small F-number, preferably between approximately 1.2 and 2.5.

In accordance with another aspect of the present invention, the beam splitter has a conversion efficiency of at least 50% defined by the product of the s-polarization reflected light and the p-polarization transmitted light ($R_sT_p$). In addition, the s-polarization transmitted light and the p-polarization reflected light are both less than 5%. Furthermore, the percentage of reflected light and the percentage of the transmitted light of the modulated beam is greater than approximately 67%.

In accordance with another aspect of the present invention, the system may include a pre-polarizer disposed between the light source and the beam splitter, and/or a post-polarizer disposed between the beam splitter and the screen.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1A:
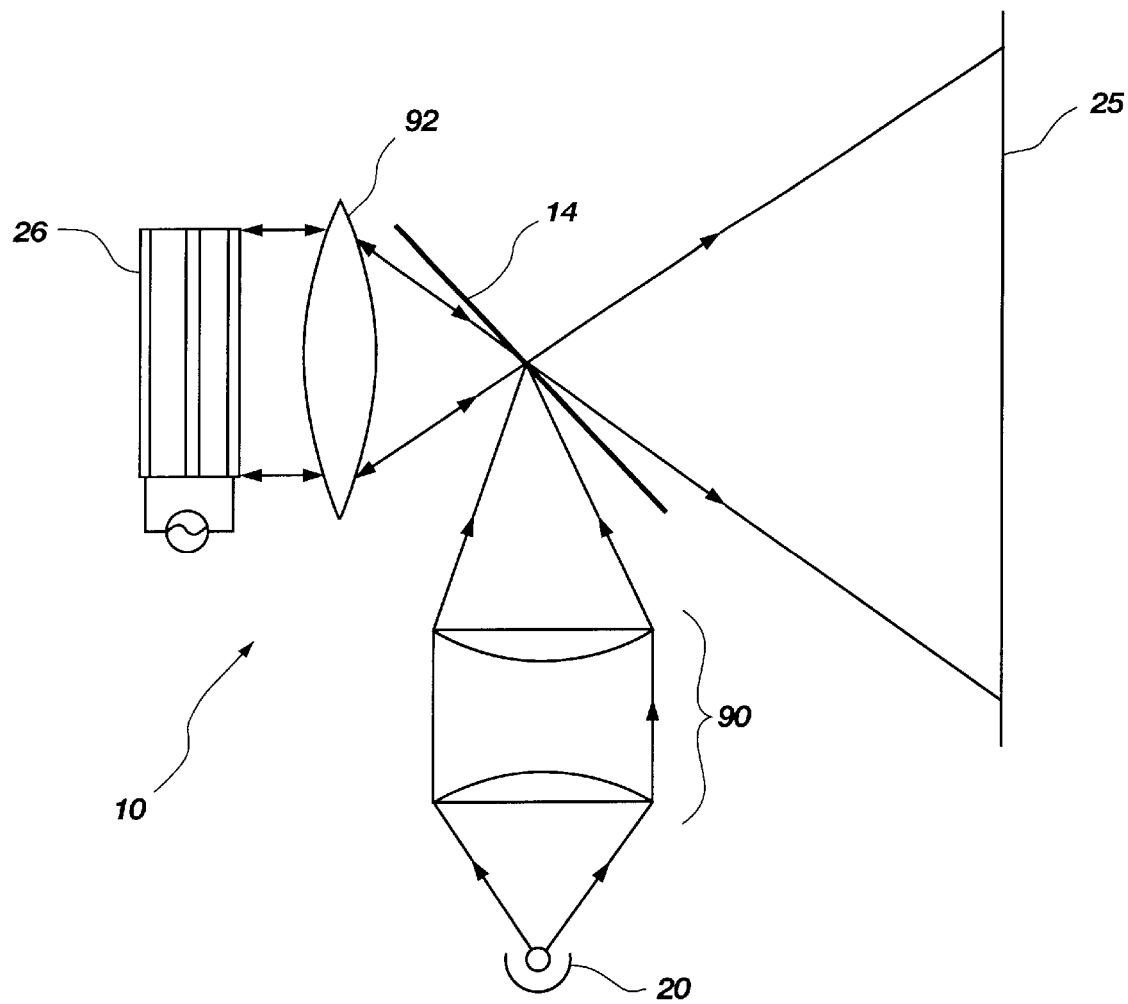
FIG. 1a is a schematic view of the general operation of a preferred embodiment of an image projection system of the present invention using a wire grid polarizing beam splitter of the present invention.

As illustrated in FIG. 1a, a display optical train of an image projection system of the present invention, indicated generally at 10, is shown. The image projection system 10 advantageously has a wire grid polarizer as the beam splitter, indicated generally at 14. The wire grid polarizing beam splitter 14 (WGP-PBS) efficiently reflects light of one polarization from a source 20 to a reflective liquid crystal array 26, and then efficiently transmits reflected light of the opposite polarization to a display screen 25.

For adequate optical efficiency, the WGP-PBS 14 must have high reflectivity ($R_s$) of the desired polarization from the light source 20, and it must have high transmissivity ($T_p$) of the opposite polarization from the liquid crystals array 26. The conversion efficiency is proportional to the product of these two, $R_sT_p$, so deficiency in one factor can be compensated to some extent by improvement in the other.

Examples of wire grid polarizing beam splitters 14 of the present invention advantageously show the following characteristics which demonstrate the advantage of using a WGP-PBS 14 of the present invention as both the polarizer and analyzer in display devices for the visible portion of the spectrum. Theoretical calculations of further improvements indicate that even better polarizing beam splitters will be available.

Figure 2A:
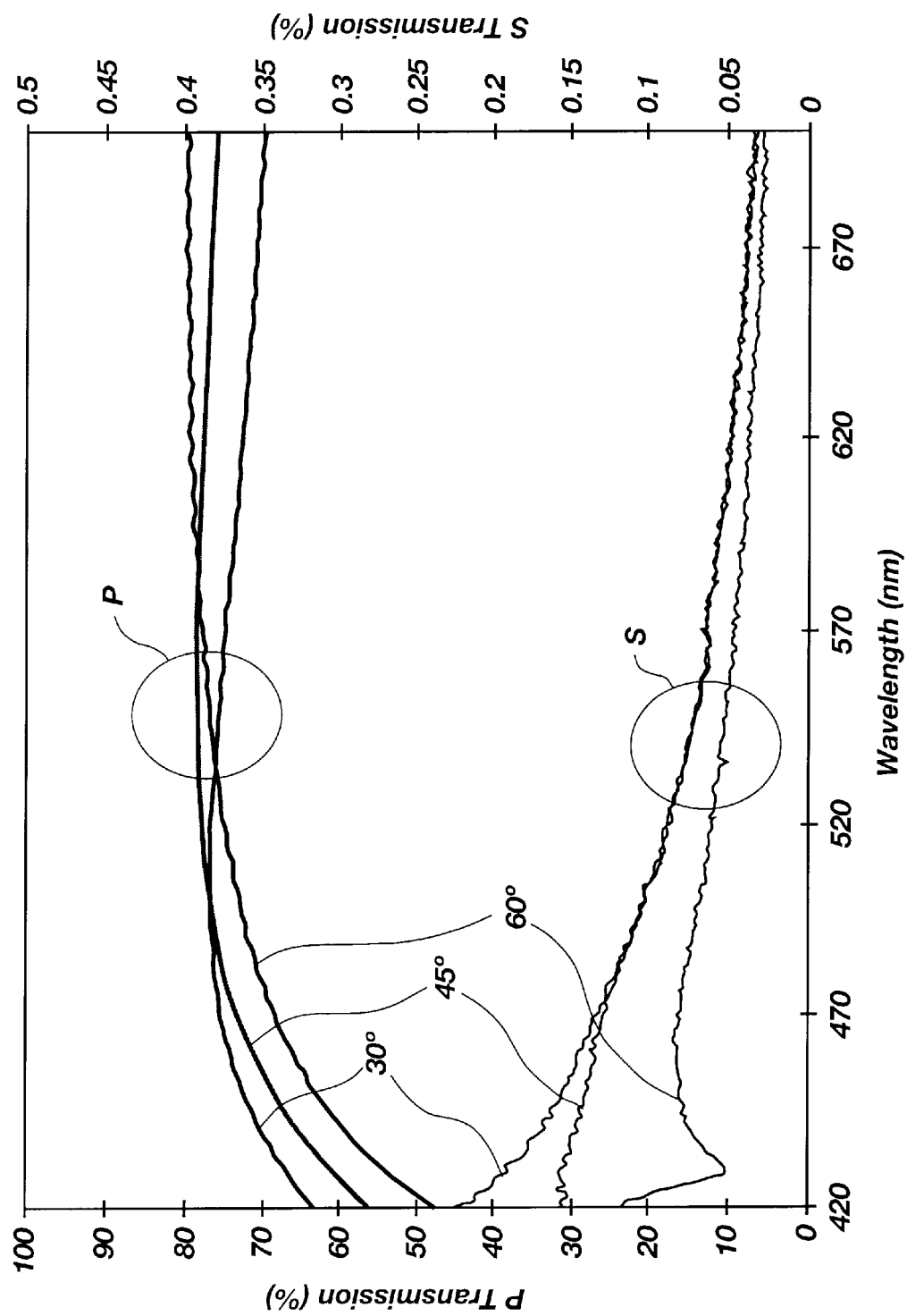
FIG. 2a is a graphical plot showing the relationship between wavelength and transmittance for both S and P polarizations of a preferred embodiment of the wire grid polarizing beam splitter of the present invention.
Figure 2B:
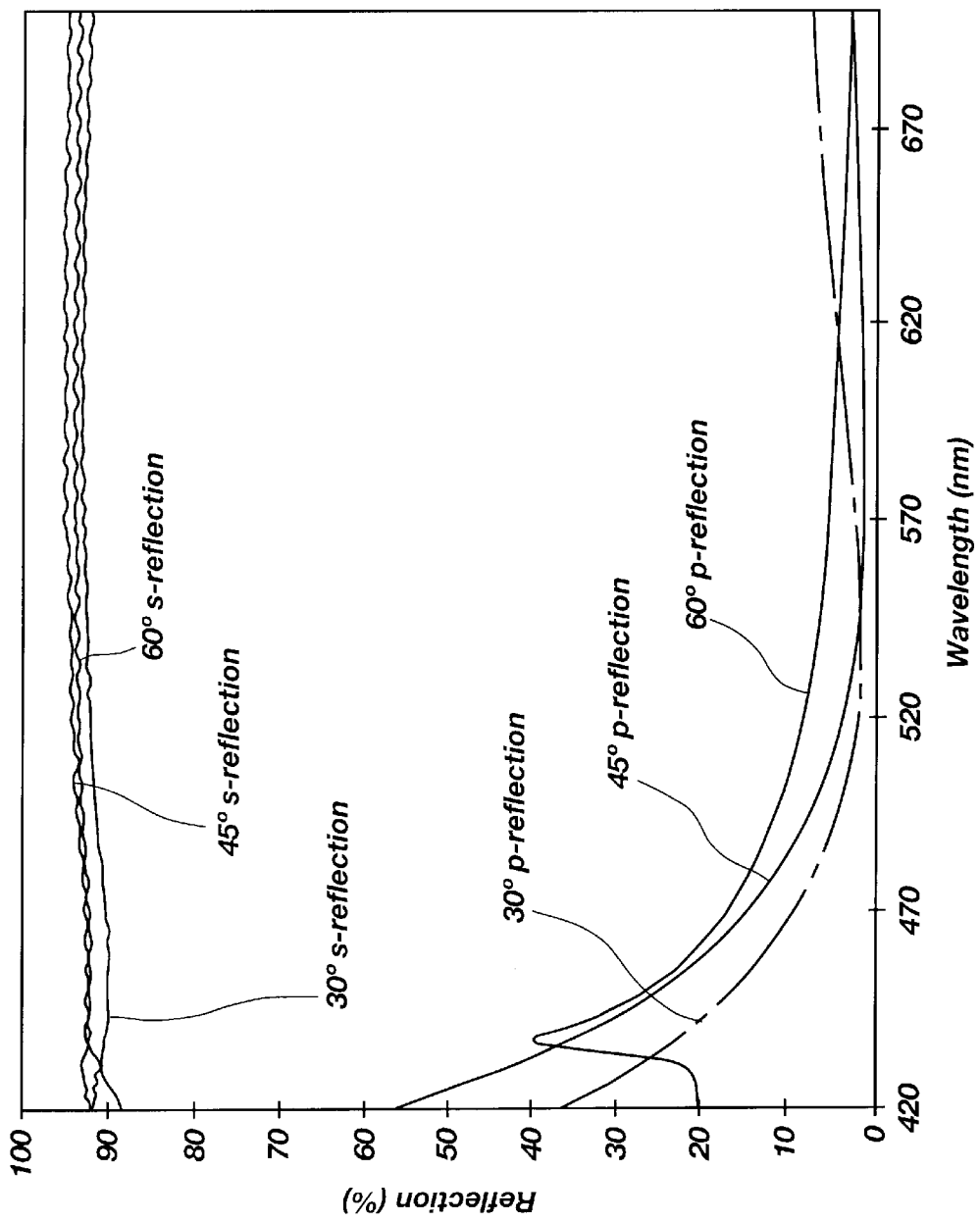
FIG. 2b is a graphical plot showing the relationship between wavelength and reflectance for both S and P polarizations of a preferred embodiment of the wire grid polarizing beam splitter of the present invention.
Figure 2C:
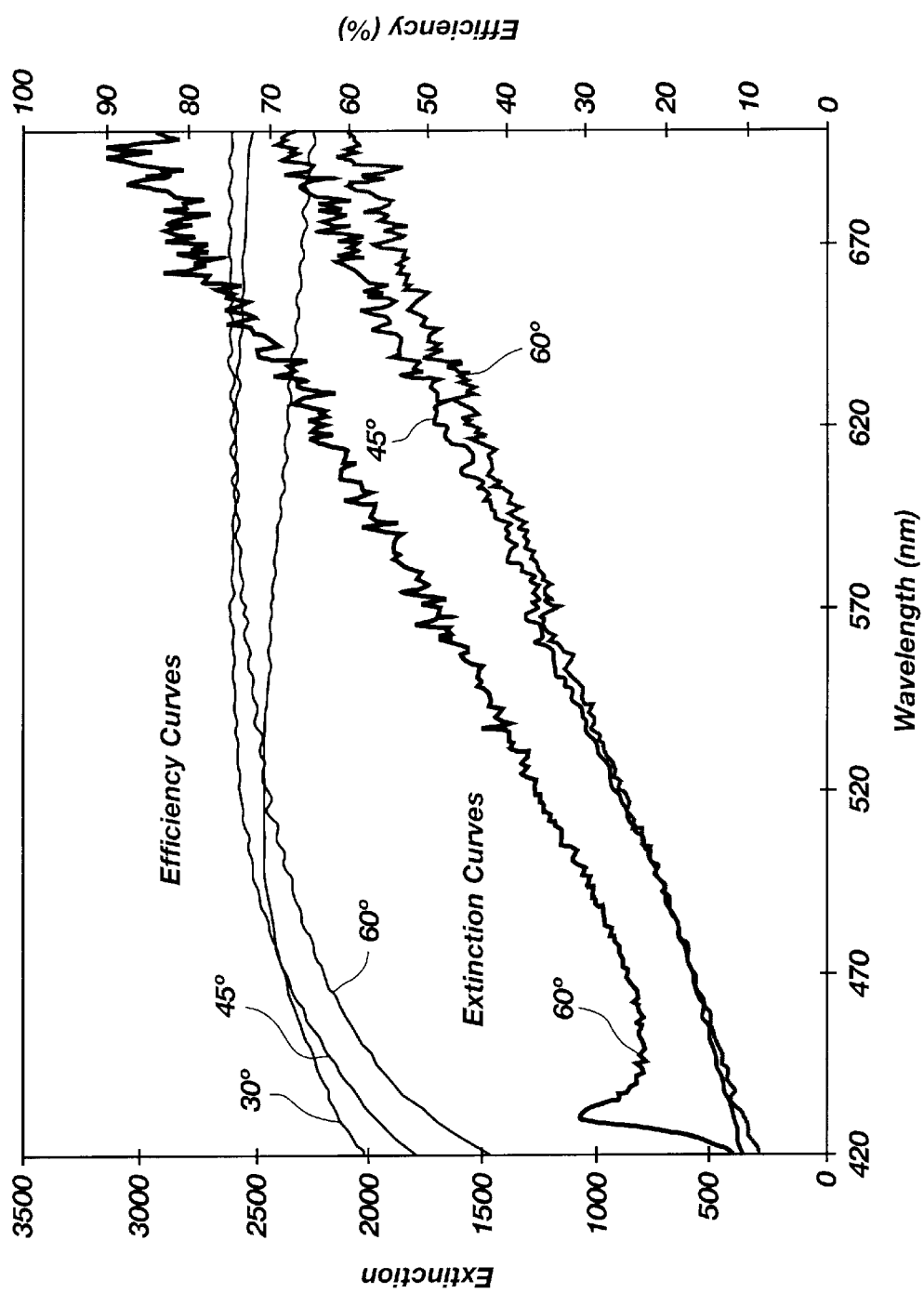
FIG. 2c is a graphical plot showing the relationship between wavelength, efficiency and transmission extinction of a preferred embodiment of the wire grid polarizing beam splitter of the present invention.

Referring to FIGS. 2a and 2b, the measured transmissivity and reflectivity, respectively, for both S and P polarizations of a WGP-PBS are shown. In FIG. 2c, the efficiency of the WGP-PBS is shown as the product of the transmissivity and reflectivity. In addition, the extinction is also shown in FIG. 2c. In FIGS. 2a–2c, the WGP-PBS is oriented to reflect the s-polarization and transmit the p-polarization at incident angles of 30°, 45° and 60°. For an image projection system, such as a projector, the product of the reflected s-polarization and transmitted p-polarization ($R_sT_p$) must be large if source light is to be efficiently placed on the screen. On the other hand, for the resolution needed to achieve high information density on the screen, it is important that the converse product ($R_pT_s$) be very small (i.e. the transmission of s-polarized light multiplied by the reflection of p-polarized light must be small). It is clear from the figures that the wire grid polarizing beam splitter of the present invention meets these standards over the entire spectrum without degradation by Rayleigh resonance or other phenomena.

Figure 3:
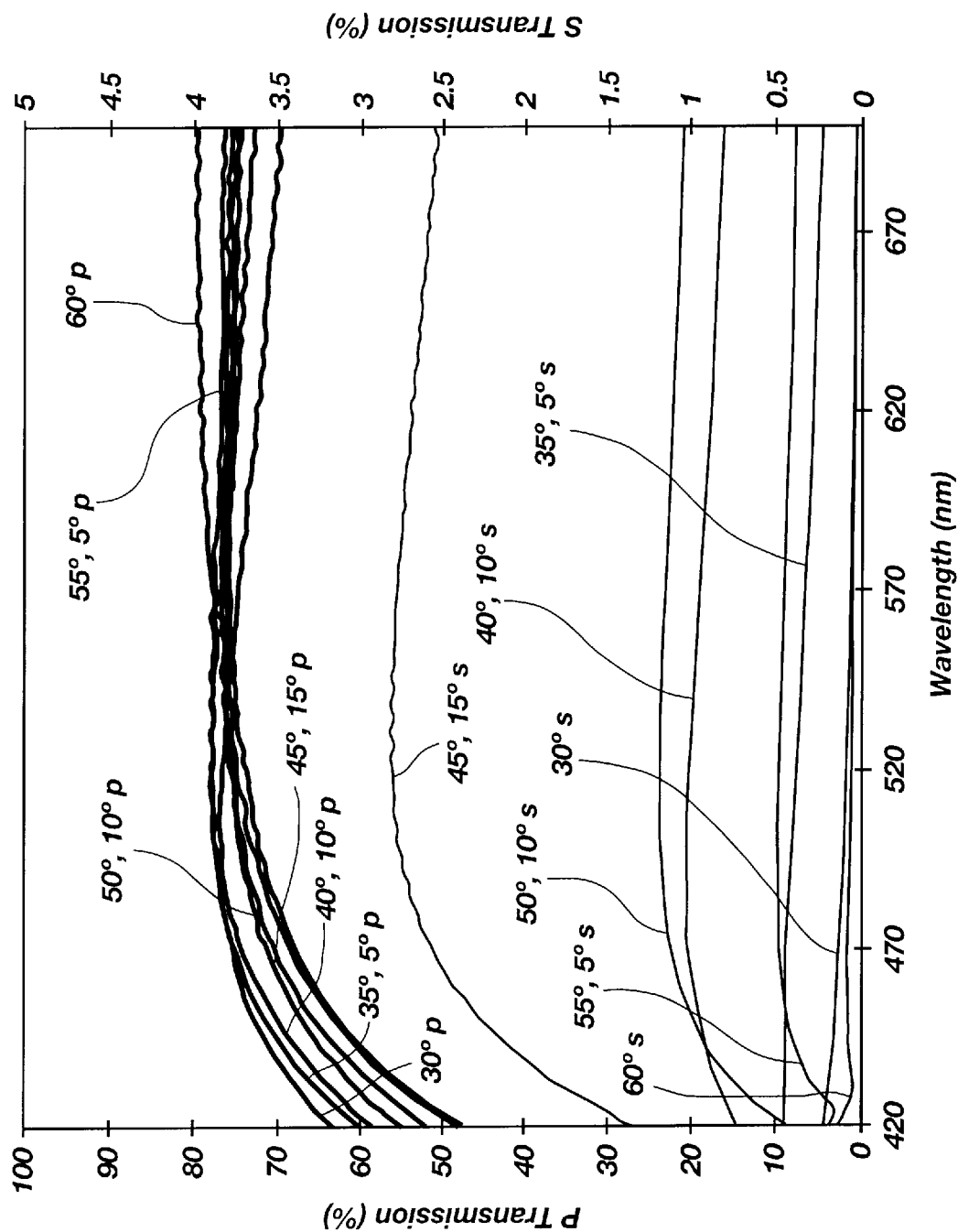
FIG. 3 is a graphical plot showing the performance of the preferred embodiment of the wire grid polarizing beam splitter of the present invention as a function of the incident angle.

Another important feature is a wide acceptance angle. This must be large if light gathering from the source, and hence the conversion efficiency, is maximized. Referring to FIG. 3, the performance of the wire grid polarizing beam splitter of the present invention is shown for various portions of the light cone centered around the optical axis which is inclined at 45°. In FIG. 3, the first referenced angle is the angle in the plane of incidence while the second referenced angle is the angle in the plane perpendicular to the plane of incidence. It is clear that the WGP-PBS of the present invention is able to accept cones of light (either diverging or converging) with half-angles between approximately 12 and 25°.

Figure 4A:
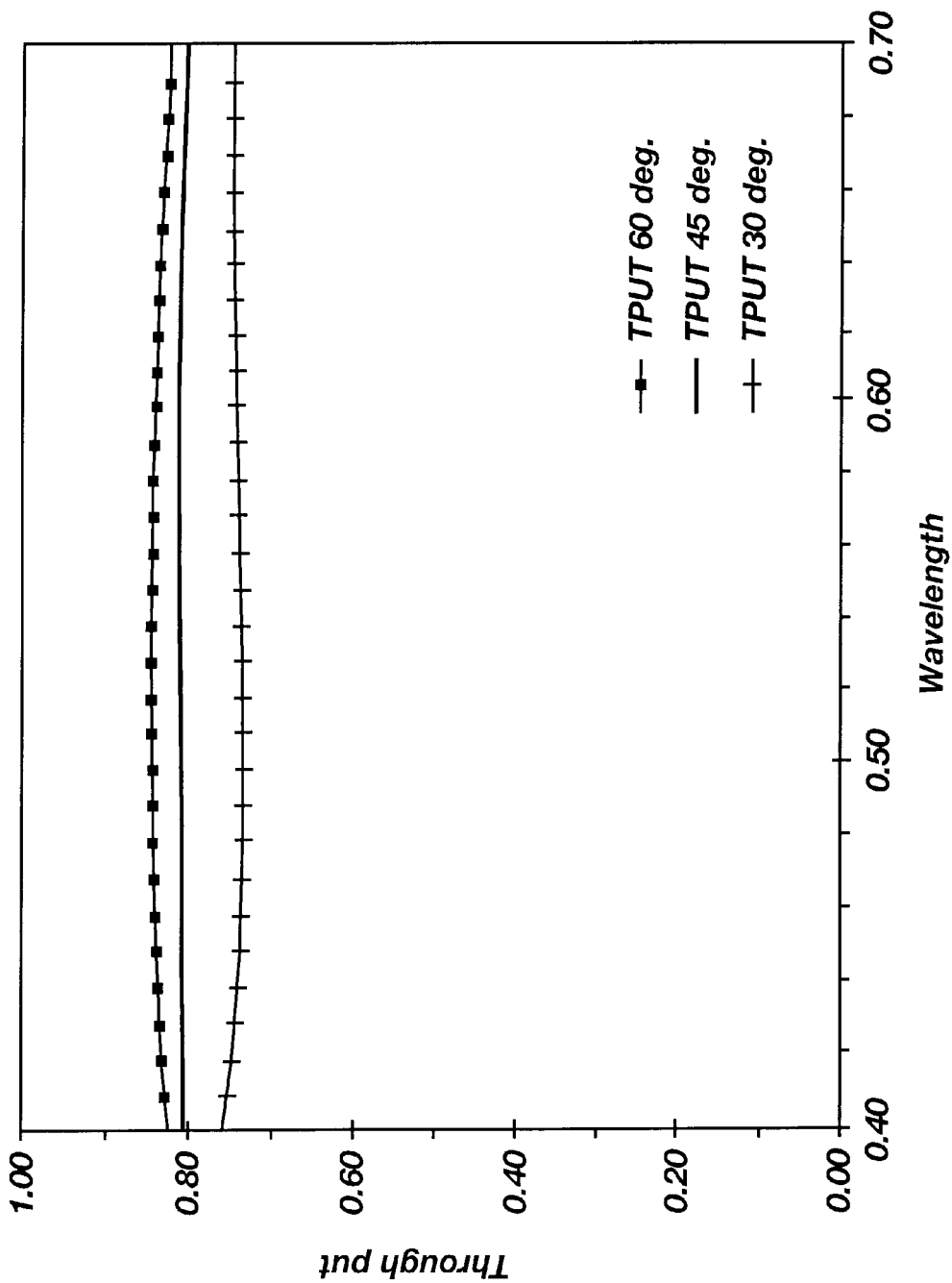
FIG. 4a is a graphical plot showing the theoretical throughput performance of an alternative embodiment of the wire grid polarizing beam splitter of the present invention.
Figure 4B:
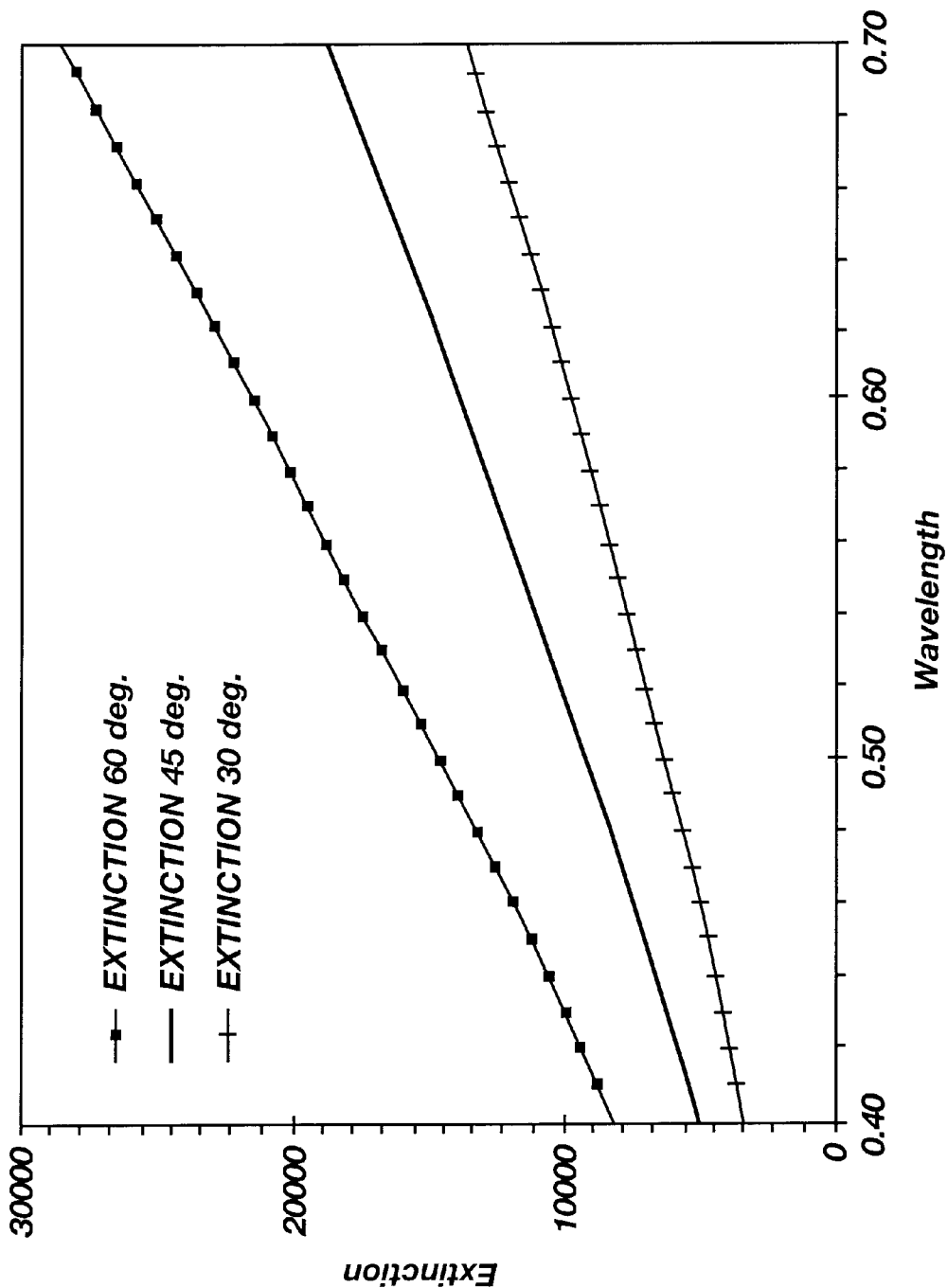
FIG. 4b is a graphical plot showing the theoretical extinction performance of an alternative embodiment of the wire grid polarizing beam splitter of the present invention.
Figure 4C:
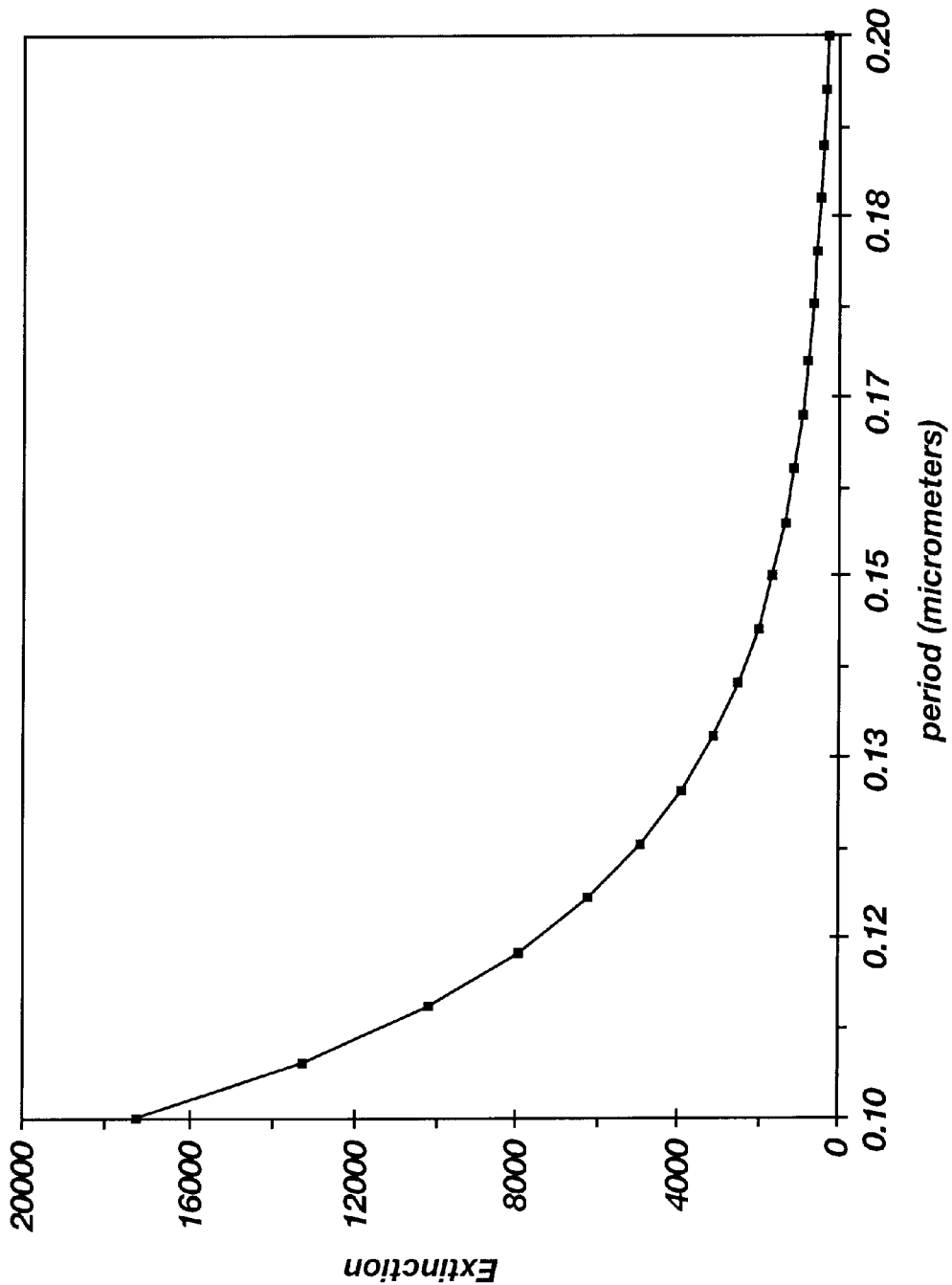
FIG. 4c is a graphical plot showing the theoretical extinction performance of an alternative embodiment of the wire grid polarizing beam splitter of the present invention.

Referring to FIGS. 4a–4c, theoretical calculations for an alternative embodiment of a wire grid polarizing beam splitter indicate that significantly larger light cones and/or other enhancements will be possible. FIGS. 4a and 4b show the theoretical throughput and extinction, respectively, of a wire grid polarizing beam splitter with a period p reduced to 130 nm. In addition, the grid height or thickness is 130 nm; the line-spacing ratio is 0.48; the substrate groove depth is 50 nm; and the substrate is BK7 glass. It should be noted in FIG. 4a that the throughput is grouped much more closely than the throughput shown in FIG. 2c. Therefore, performance can be improved by reducing the period p. It should be noted in FIG. 4b that the extinction is significantly increased in comparison to FIG. 2c.

FIG. 4c shows the theoretical extinction of another alternative embodiment of the wire grid polarizing beam splitter with the period p further reduced. The wavelength is 420 nm and the incidence angle is 30°. It should be noted that the extinction increases markedly as the period p is reduced.

Figure 1C:
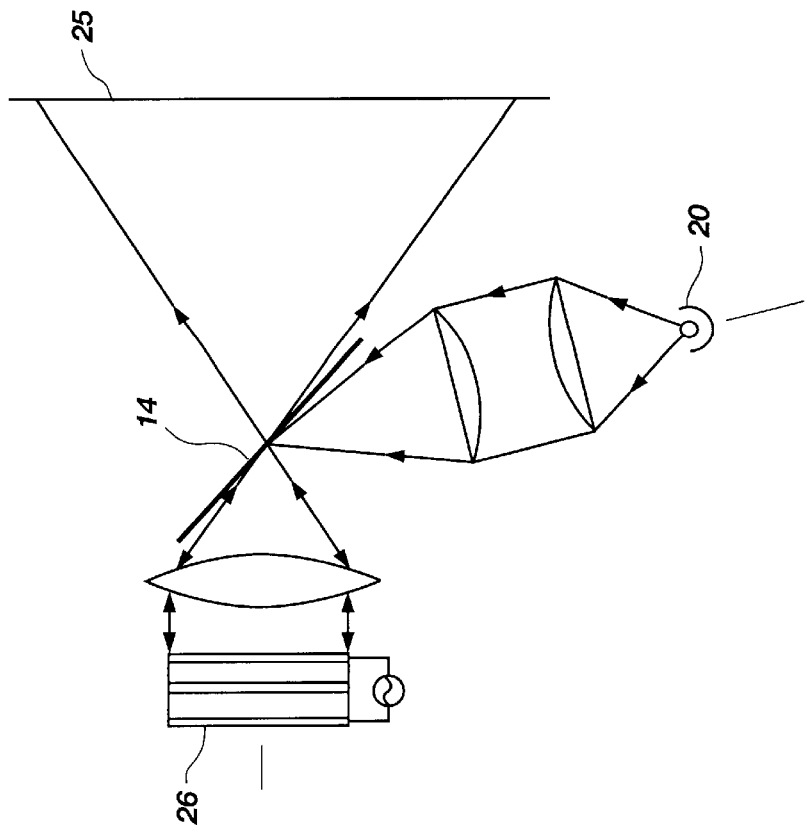
FIGS. 1b and 1c are schematic views of the image projection system of the present invention in different configurations.
Figure 1B:
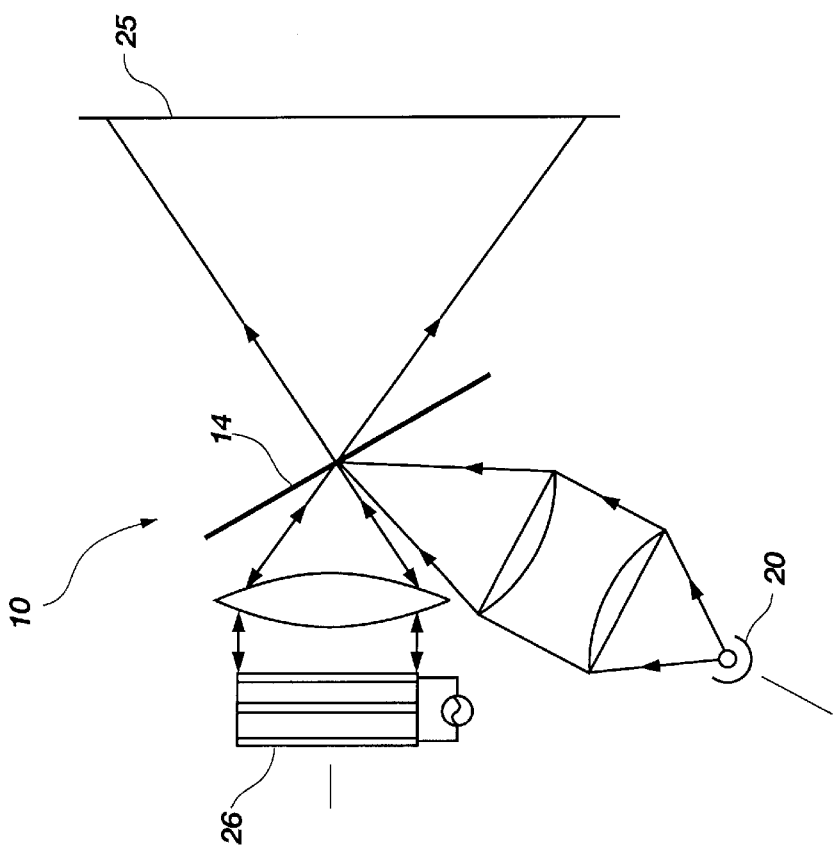

As indicated above, an important consequence of the ability to accept larger light cones with a WGP-PBS that will work well at large angles is that the PBS no longer restricts the optical design of the imaging system. Thus, conventional light sources can be used, with the advantage of their low cost, cooler operation, small size, and low weight. The wide range of angles over which the WGP-PBS works well makes it possible for the designer to position the other optical elements in favorable positions to improve the size and operation of the display. Referring to FIGS. 1b and 1c, the design flexibility provided by the wide range of angles of the PBS of the present invention is demonstrated. As shown in FIG. 1b, the light source 20 and array 26 may be positioned closer together, with both having a relatively small incident angle with respect to the PBS 14. Such a configuration is advantageous for a compact design of the components of the system 10. Alternatively, as shown in FIG. 1c, the light source 20 and array 26 may be positioned farther apart, with both having a relatively large incident angle. In should be noted that in either case, the incidence angles vary greatly from the 45 degree angle typically required by traditional beam splitters.

Yet other features of wire grids provide advantages for display units. The conventional technology requires the use of a glass cube. This cube imposes certain requirements and penalties on the system. The requirements imposed include the need to deal with thermal loading of this large piece of glass, the need for high quality materials without stress birefringence, etc., which impose additional cost, and the extra weight and bulk of the cube itself. The WGP-PBS of the present invention advantageously is a divided or patterned thin film that does not occupy much volume and does not weigh very much. It can even be integrated with or incorporated into other optical elements such as color filters, to further reduce part count, weight, and volume of the projection system.

The WGP-PBS of the present invention is also very robust. Modern light sources generate very high thermal gradients in the polarizer immediately after the light is switched on. At best, this can induce thermal and stress birefringence which causes cross talk between polarizations. At worst, it can delaminate multilayer polarizers or cause the cemented interface in a cube beam splitter to separate. What is more, the long duration of exposure to intense light causes some materials to change properties (typically yellowing from photo-oxidation). However, wire grid polarizing beam splitters are made of chemically inert metal that is well attached to glass or other substrate materials. They have been shown to withstand high temperatures as well as long periods of intense radiation from light sources.

The WGP-PBS of the present invention also is easy to align. It is a single part that needs to be adjusted to direct the source beam onto the liquid crystal array. This is the same simple procedure that would be used for a flat mirror. There is another adjustment parameter, namely, the angular rotation about the normal to the WGP surface. This determines the orientation of polarization in the light beam. This adjustment is not critical because the WGP functions as its own analyzer and cannot be out of alignment in this sense. If there are other polarizing elements in the optical train, the WGP-PBS should be oriented with respect to their polarization, but slight misalignment is not critical because: according to Malus' law, angular variation makes very little difference in the intensity transmitted by polarizers if their polarization axes are close to being parallel (or perpendicular).

In order to be competitive with conventional polarizers, the product $R_sT_p$ must be above approximately 50%. This represents a lower estimate which would only be practical if the WGP-PBS was able to gather significantly more light from the light source than the conventional polarizing beam splitters. The estimate of 50% comes from an assumption that the best conventional beam splitter, a modern MacNeille cube beam splitter, can deliver an f/# of about f/2.5 at best. An optical system which was twice as fast, or capable of gathering twice as much light, would then have an f/# of $1/\sqrt{2}$ of this value, or about f/1.8, which is certainly a reasonable f/# in optical image projection systems. A system which is twice as fast, and therefore capable of gathering twice the light from the source, would approximately compensate for the factor of 2 decrease in the $R_sT_p$ product over the conventional cube beam splitter, resulting in an equivalent projection system performance. In fact, since a WGP-PBS can potentially be used down below f/1.2 (a factor of four increase) this seemingly low limit can still produce very bright images of course, an $R_sT_p$ product which is over this minimum value will provide even better performance.

Another important performance factor is contrast in the image, as defined by the ratio of intensities of light to dark pixels. One of the significant advantages of the WGP-PBS is the improved contrast over compound incident angles in comparison to the prior art cube beam splitter such as a McNeille prism. The physics of the McNeille prism polarizes light by taking advantage of the difference in reflectivity of S vs. P polarization at certain angles. Because S and P polarization are defined with respect to the plane of incidence, the effective S and P polarization for a particular ray in a cone of light rotates with respect to the ray along the optical axis as various rays within the cone of light are considered. The consequence of this behavior is the well-known compound angle problem in which the extinction of the polarizer is significantly reduced for certain ranges of angles within the cone of light passing through the polarizing beam splitter, significantly reducing the average contrast over the cone.

The WGP-PBS, on the other hand, employs a different physical mechanism to accomplish the polarization of light which largely avoids this problem. This difference in behavior is due to the fact that the polarization is caused by the wire grids in the beam splitter which have the same orientation in space regardless of the plane of incidence for any particular ray in the cone of light. Therefore, even though the plane of incidence for any particular ray is the same when incident on a McNeille prism or a WGP, the polarization effect is only dependent on the plane of incidence in the case of the McNeille prism, meaning the compound angle performance of the WGP is much improved over that provided by the cube beam splitter.

The fact that the function of the WGP-PBS is independent of the plane of incidence means that the WGP-PBS can actually be used with the wires or elements oriented in any direction. The preferred embodiment of the invention has the elements oriented parallel to the axis around which the polarizer is tilted so that the light strikes the WGP-PBS at an angle. This particular orientation is preferred because it causes the polarization effects of the surface reflections from the substrate to be additive to the polarization effects from the grid. It is possible, however, to produce a WGP-PBS which functions to reflect the P-polarization and transmit the S-polarization (which is exactly opposite what has been generally described herein) over certain ranges of incident angles by rotating the grid elements so they are perpendicular to the tilt axis of the WGP-PBS. Similarly, the grid elements can be placed at an arbitrary angle to the tilt axis to obtain a WGP-PBS which functions to transmit and reflect light with polarizations aligned with the projection of this arbitrary angle onto the wavefront in the light beam. It is therefore clear that WGP-PBS which reflect the P-polarization and transmit the S-polarization, or which reflect and transmit light with polarization oriented at arbitrary angles are included within this invention.

The compound angle performance advantage of the WGP-PBS provides an inherently more uniform contrast over the entire light cone, and is one of the reasons the WGP is suitable for very small f-numbers. But, of course, it is not the only factor affecting the image contrast. The image contrast is governed to a large extent by low leakage of the undesired polarization, but in this case the product $T_sR_p$ is not the important parameter, because the image generating array which lies in sequence after the first encounter with the beam splitter but before the second also takes part in the production of the image contrast. Therefore, the final system contrast will depend on the light valve performance as well as the polarizer extinction. However, lower bounds on the required beam splitter performance can be determined with the assumption that the light valve performance is sufficient enough that it can be assumed to have an essentially infinite contrast. In this case, the system contrast will depend entirely on the beam splitter performance.

Referring to FIG. 1a, there are two different functions fulfilled by the beam splitter 14. The first is the preparation of the polarized light before it strikes the liquid crystal array 26 or other suitable image generation device. The requirement here is that the light be sufficiently well polarized that any variations in the polarization of the light beam created by the light valve can be adequately detected or analyzed such that the final image will meet the desired level of performance. Similarly, the beam splitter 14 must have sufficient performance to analyze light which is directed by the light valve back to the beam splitter so that the desired system contrast performance is achieved.

These lower bounds can be determined fairly easily. For reasons of utility and image quality, it is doubtful that an image with a contrast of less than 10:1 (bright pixel to adjacent dark pixel) would have much utility. Such a display would not be useful for dense text, for example. If a minimum display system contrast of 10:1 is assumed, then an incident beam of light is required which has at least 10 times the light of the desired polarization state over that of the undesired polarization state. In terms of polarizer performance, this would be described as having an extinction of 10:1 or of simply 10.

The second encounter with the beam splitter 14 which is going to analyze the image, must be able to pass the light of the right polarization state, while eliminating most of the light of the undesired state. Again, assuming from above a light beam with an image encoded in the polarization state, and that this light beam has the 10:1 ratio assumed, then a beam splitter is desired which preserves this 10:1 ratio to meet the goal of a system contrast of 10:1. In other words, it is desired to reduce the light of the undesired polarization by a factor of 10 over that of the right polarization. This again leads to a minimum extinction performance of 10:1 for the analysis function of the beam splitter.

Clearly, higher system contrast will occur if either or both of the polarizer and analyzer functions of the beam splitter have a higher extinction performance. It is also clear that it is not required that the performance in both the analyzer function and the polarizer function of the beam splitter be matched for a image projection system to perform adequately. An upper bound on the polarizer and analyzer performance of the beam splitter is more difficult to determine, but it is clear that extinctions in excess of approximately 20,000 are not needed in this application. A good quality movie projection system as found in a quality theater does not typically have an image contrast over about 1000, and it is doubtful that the human eye can reliably discriminate between an image with a contrast in the range of several thousand and one with a contrast over 10,000. Given a need to produce an image with a contrast of several thousand, and assuming that the light valves capable of this feat exist, an upper bound on the beam splitter extinction in the range of 10,000–20,000 would be sufficient.

The above delineation of the minimum and maximum bounds on the wire grid beam splitter is instructive, but as is clear from the demonstrated and theoretical performance of a wire grid beam splitter as shown above, much better than this can be achieved. In accordance with this information, the preferred embodiment has $R_sT_p \geq 65\%$, and $R_p$ or $T_p$ or both are $\geq 2\ 67\%$, as shown in FIGS. 2a–2c. The preferred embodiment would also employ the wire grid polarizing beam splitter in the mode where the reflected beam is directed to the image generating array, with the array directing the light back to the beam splitter such that it passes through, or is transmitted through, the beam splitter. This preferred embodiment is shown in FIG. 1a.

Figure 5A:
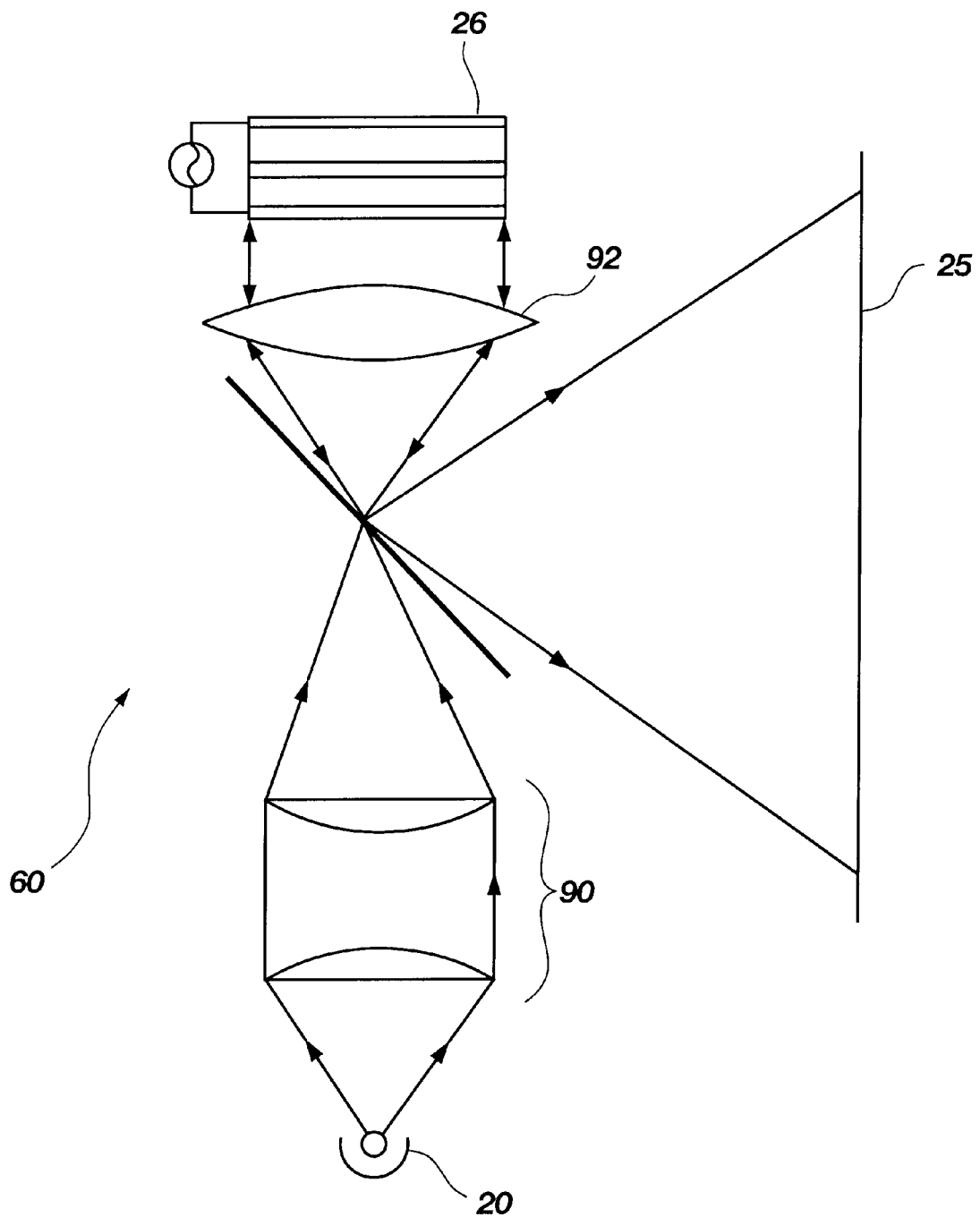
FIG. 5a is a schematic view of the general operation of an alternative embodiment of an image projection system of the present invention.

Alternatively, as shown in the image display system 60 of FIG. 5a, the wire grid polarizing beam splitter 14 may efficiently transmit light of one polarization from the source 20 to the reflective liquid crystal array 26, and then efficiently reflect the reflected light of the opposite polarization to the display screen 25. The second embodiment of the image projection system 60 is similar to that of the preferred embodiment shown in FIG. 1a, with the exception that the beam splitter 14 would be employed in a manner in which the source beam of light is transmitted or passed through the beam splitter 14 and directed at the image generating array 26, then is reflected back to the beam splitter 14 where it is reflected by the beam splitter and analyzed before being displayed on the screen 25.

Figure 5C:
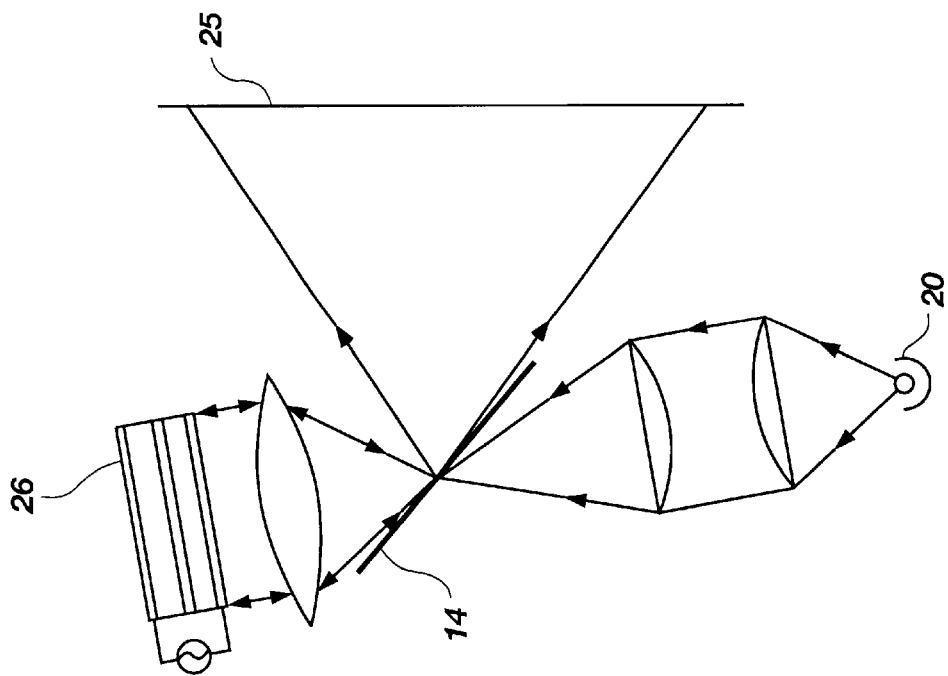
FIGS. 5b and 5c are schematic views of the image projection system of the present invention in different configurations.
Figure 5B:
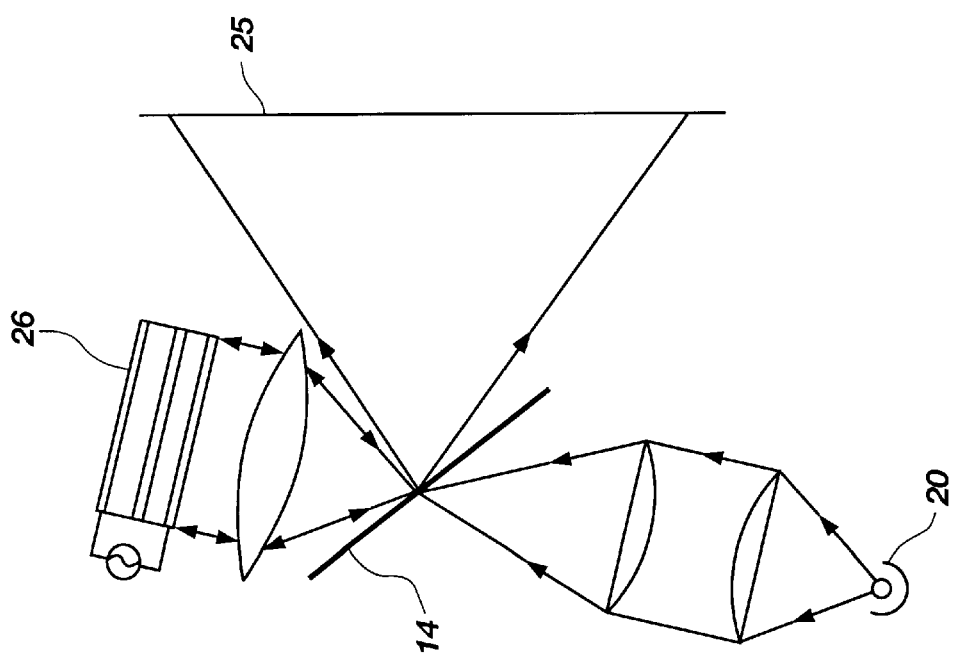

Again, referring to FIGS. 5b and 5c, the design flexibility provided by the wide range of angles of the PBS of the present invention is demonstrated. As shown in FIG. 5b, the array 26 and screen 25 may be positioned closer together, with both having a relatively small incident angle with respect to the PBS 14. Alternatively, as shown in FIG. 5c, the array 26 and screen 25 may be positioned farther apart, with both having a relatively large incident angle.

Figure 6:
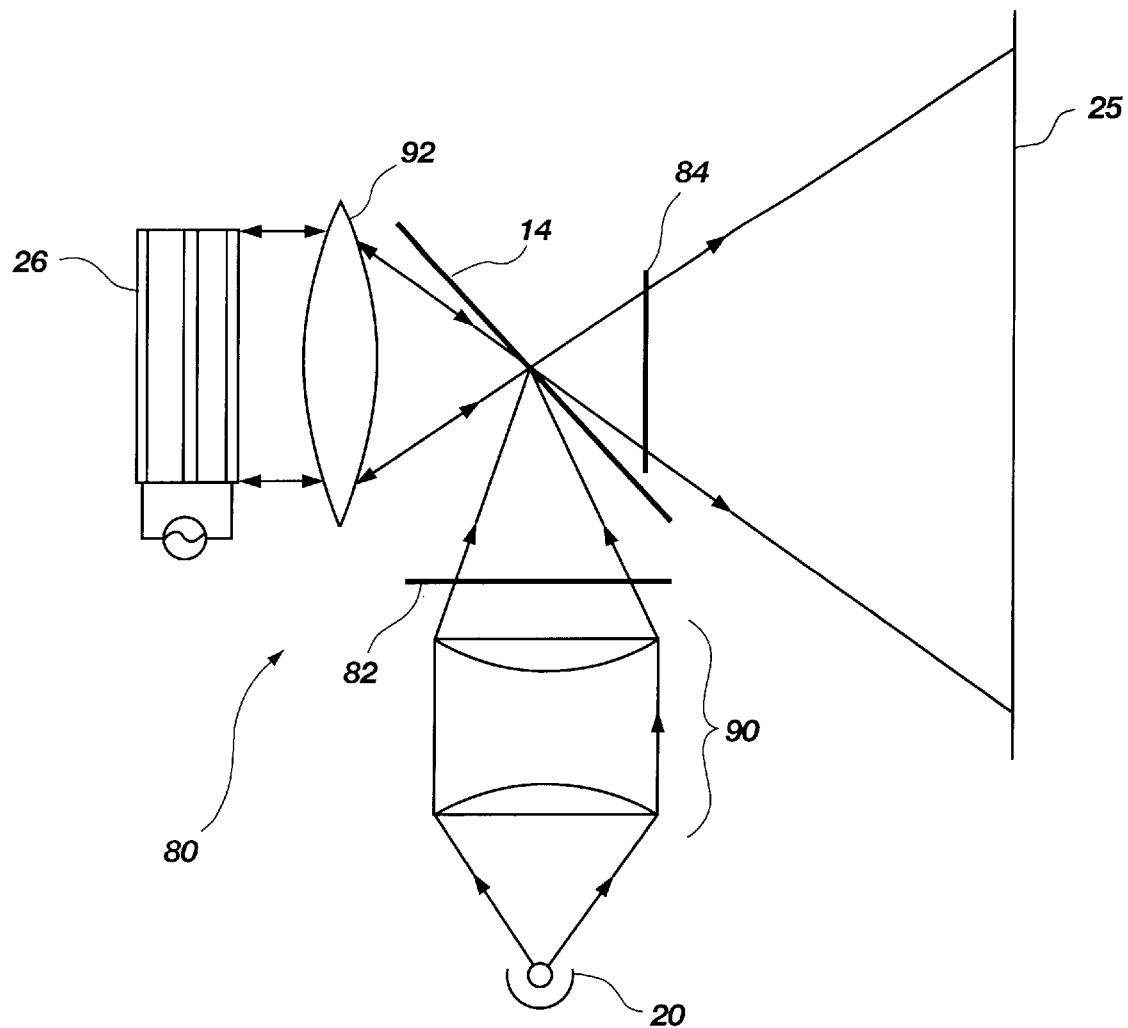
FIG. 6 is a schematic view of the general operation of an alternative embodiment of an image projection system of the present invention.

As shown in FIG. 6, a third embodiment of image projection system 80 provides an alternative system design which may assist in achieving a desired level of system performance. This third embodiment would include one or more additional transmissive or reflective polarizers which work in series with the wire grid polarizing beam splitter to increase the extinction of either or both of the polarizing and analyzing functions to achieve the necessary system contrast performance. Another reason for additional polarizers would be the implementation of a polarization recovery scheme to increase the system efficiency. A pre-polarizer 82 is disposed in the source light beam between the light source 20 and the WGP-PBS 14. A post-polarizer or clean-up polarizer 84 is disposed in the modulated beam, or the beam reflected from the array 26, between the array 26 and the screen 25, or between the WGP-PBS 14 and the screen 25. The third embodiment would still realize the advantages of the wire grid beam splitter's larger light cone, durability, and the other advantages discussed above.

As shown in the figures, the image display system may also utilize light gathering optics 90 and projection optics 92.

Figure 7:
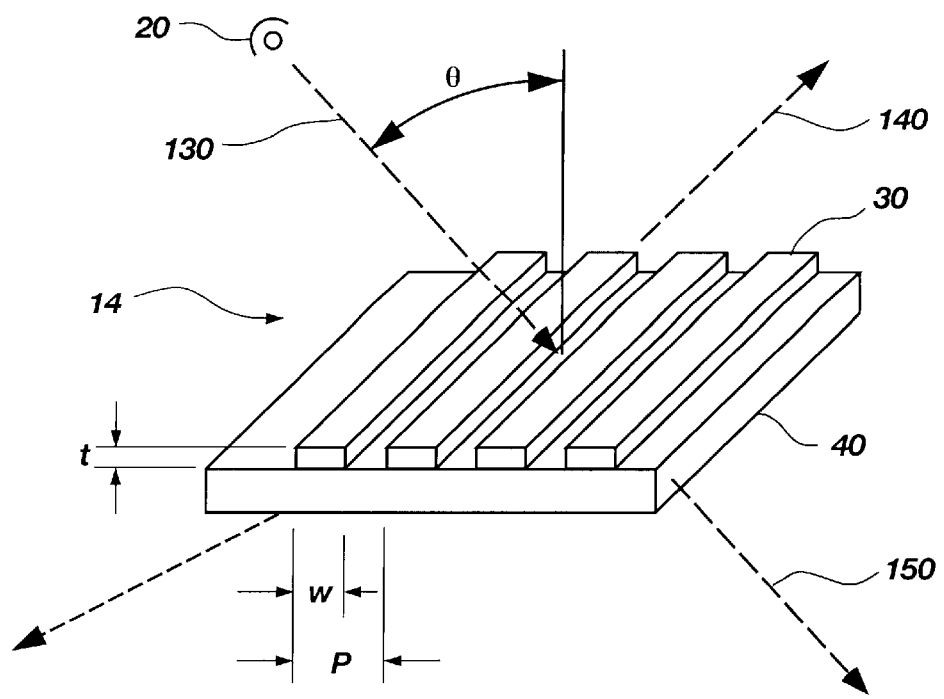
FIG. 7 is a perspective view of the wire grid polarizing beam splitter of the present invention.
Figure 8:
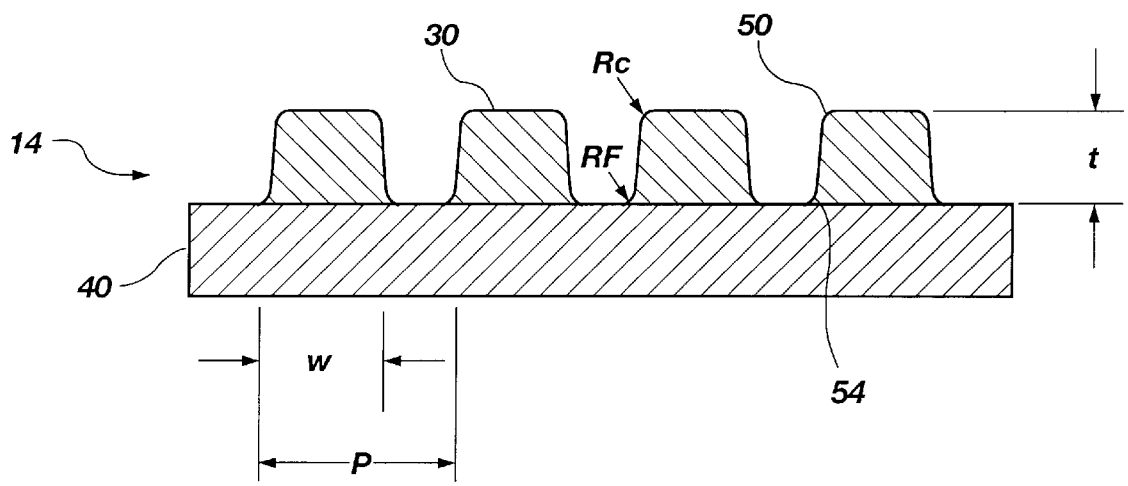
FIG. 8 is a cross sectional side view of the wire grid polarizing beam splitter of the present invention.

Referring to FIGS. 7 and 8, the wire grid polarizing beam splitter 14 of the present invention is shown in greater detail. The polarizing beam splitter is further discussed in greater detail in co-pending U.S. application Ser. No. 09/390,833, , filed Sep. 7, 1999, and now allowed, which is herein incorporated by reference.

As described in the co-pending application, the polarizing beam splitter 14 has a grid 30, or an array of parallel, conductive elements, disposed on a substrate 40. The source light beam 130 produced by the light source 20 is incident on the polarizing beam splitter 14 with the optical axis at an angle θ from normal, with the plane of incidence preferably orthogonal to the conductive elements. An alternative embodiment would place the plane of incidence at an angle θ to the plane of conductive elements, with Θ approximately 45°. Still another alternative embodiment would place the plane of incidence parallel to the conductive elements. The polarizing beam splitter 14 divides this beam 130 into a specularly reflected component 140, and a transmitted component 150. Using the standard definitions for S and P polarization, the light with S polarization has the polarization vector orthogonal to the plane of incidence, and thus parallel to the conductive elements. Conversely, light with P polarization has the polarization vector parallel to the plane of incidence and thus orthogonal to the conductive elements.

Ideally, the polarizing beam splitter 14 will function as a perfect mirror for the S polarized light, and will be perfectly transparent for the P polarized light. In practice, however, even the most reflective metals used as mirrors absorb some fraction of the incident light, and thus the WGP will reflect only 90% to 95%, and plain glass does not transmit 100% of the incident light due to surface reflections.

The key physical parameters of the wire grid beam splitter 14 which must be optimized as a group in order to achieve the level of performance required include: the period p of the wire grid 30, the height or thickness t of the grid elements 30, the width w of the grids elements 30, and the slope of the grid elements sides. It will be noted in examining FIG. 8 that the general cross-section of the grid elements 30 is trapezoidal or rectangular in nature. This general shape is also a necessary feature of the polarizing beam splitter 14 of the preferred embodiment, but allowance is made for the natural small variations due to manufacturing processes, such as the rounding of corners 50, and fillets 54, at the base of the grid elements 30.

It should also be noted that the period p of the wire grid 30 must be regular in order to achieve the specular reflection performance required to meet the imaging fidelity requirements of the beam splitter 14. While it is obviously better to have the grid 30 completely regular and uniform, some applications may have relaxed requirements in which this is not as critical. However, it is believed that a variation in period p of less than 10% across a meaningful dimension in the image (such as the size of a single character in a textual display, or a few pixels in an image) is required to achieve the necessary performance.

Similarly, reasonable variations across the beam splitter 14 in the other parameters described, such as the width w of the grid elements 30, the grid element height t, the slopes of the sides, or even the corner rounding 50, and the fillets 54, are also possible without materially affecting the display performance, especially if the beam splitter 14 is not at an image plane in the optical system, as will often be the case. These variations may even be visible in the finished beam splitter 14 as fringes, variations in transmission efficiency, reflection efficiency, color uniformity, etc. and still provide a useful part for specific applications in the projection imaging system.

The design goal which must be met by the optimization of these parameters is to produce the best efficiency or throughput possible, while meeting the contrast requirements of the application. As stated above, the minimum practical extinction required of the polarizing beam splitter 14 is on the order of 10. It has been found that the minimum required throughput ($R_sT_p$) of the beam splitter 14 in order to have a valuable product is approximately 50%, which means either or both of Rp and Ts must be above about 67%. Of course, higher performance in both the throughput and the extinction of the beam splitter will be of value and provide a better product. In order to understand how these parameters affect the performance of the wire grid beam splitter, it is necessary to examine the variation in performance produced by each parameter for an incident angle of 45°, and probably other angles of interest.

The performance of the wire grid beam splitter 14 is a function of the period p. The period p of the wire grid elements 30 must fall under approximately 0.21 $\mu$m to produce a beam splitter 14 which has reasonable performance throughout the visible spectrum, though it would be obvious to those skilled in the art that a larger period beam splitter would be useful in systems which are expected to display less than the full visible spectrum, such as just red, red and green, etc.

The performance of the wire grid beam splitter 14 is a function of the element height or thickness t. The wire-grid height t must be between about 0.04 and 0.5 $\mu$m in order to provide the required performance.

The performance of the wire grid beam splitter 14 is a function of the width to period ratio (w/p) of the elements 30. The width w of the grid element 30 with respect to the period p must fall within the ranges of approximately 0.3 to 0.76 in order to provide the required performance.

The performance of the wire grid beam splitter 14 is a function of the slopes of the sides of the elements 30. The slopes of the sides of the grid elements 30 preferably are greater than 68 degrees from horizontal in order to provide the required performance.

It is to be understood that the described embodiments of the invention are illustrative only, and that modifications thereof may occur to those skilled in the art. For example, the inclusion of the wire grid beam splitter on a substrate with optical power, such that the grid beam splitter is combined or integrated with other elements to reduce the number of optics required, the system weight, the system volume, or to achieve other desirable attributes. Other alterations will surely occur to those skilled in the art given the significant increase in design flexibility over the prior art that is achieved by the present invention. Accordingly, this invention is not to be regarded as limited to the embodiments disclosed, but is to be limited only as defined by the appended claims herein.

What is claimed is:

1. An image projection system for providing a bright and clear image, the system comprising:

a light source producing a visible light beam;

a polarizing beam splitter located near the light source in the light beam and oriented at an angle with respect to the light beam, the beam splitter comprising a transparent substrate having a first surface located in the light beam with the light beam striking the first surface at an angle, and a generally parallel arrangement of thin, elongated elements supported by the substrate, the arrangement being configured and the elements being sized to interact with electromagnetic waves of the source light beam to generally (i) transmit light through the elements which has a polarization oriented perpendicular to a plane that includes at least one of the elements and the direction of the incident light beam, defining a transmitted beam, and (ii) reflect light from the elements which has a polarization oriented parallel with the plane that includes at least one of the elements and the direction of the incident light beam, defining a reflected beam;

a reflective array located near the polarizing beam splitter in either the reflected or transmitted beam, the array modulating the polarization of the beam by selectively altering the polarization of the beam to encode image information thereon and creating a modulated beam, the array being oriented to direct the modulated beam back towards the polarizing beam splitter;

the beam splitter further being located in the modulated beam and oriented at an angle with respect to the modulated beam, and the arrangement of elements of the beam splitter interacting with electromagnetic waves of the modulated beam to generally (i) transmit light through the elements which has a polarization oriented perpendicular to the plane that includes at least one of the elements and the direction of the incident light beam, defining a second transmitted beam, and (ii) reflect light from the elements which has a polarization parallel with the plane that includes at least one of the elements and the direction of the incident light beam, defining a second reflected beam, to separate out the unaltered polarization from the modulated beam;

a screen located in either the second reflected beam or the second transmitted beam for displaying the encoded image information.

2. The system of claim 1, wherein the beam splitter is a generally planar sheet.

3. The system of claim 1, wherein the beam splitter is oriented with respect to the light beam or the modulated beam at an incident angle between approximately 0 to 80 degrees.

4. The system of claim 1, wherein the beam splitter is oriented with respect to the light beam or the modulated beam at incidence angles greater than 47 degrees or less than 43 degrees.

5. The system of claim 1, wherein the light beam has a useful divergent cone with a half angle between approximately 12 and 25°.

6. The system of claim 1, wherein the beam splitter is used at an F-number less than approximately f/2.5.

7. The system of claim 1, wherein the beam splitter has a throughput of at least 50% defined by the product of the fractional amount of p-polarization transmitted light and the fractional amount of s-polarization reflected light; and wherein the s-polarization transmitted light and p-polarization reflected light are both less than 5%.

8. The system of claim 1, wherein the beam splitter has a throughput of at least 50% defined by the product of the fractional amount of s-polarization transmitted light and the fractional amount of p-polarization reflected light; and wherein the p-polarization transmitted light and s-polarization reflected light are both less than 5%.

9. The system of claim 1, wherein the beam splitter has a throughput for the light beam of at least 65%, defined by the product of the fractional amount of reflected light and the fractional amount of transmitted light; and wherein the percent of reflected light or the percent of transmitted light is greater than approximately 67%.

10. The system of claim 1, further comprising a pre-polarizer disposed between the light source and the beam splitter.

11. The system of claim 1, further comprising a post-polarizer disposed between the beam splitter and the screen.

12. The system of claim 1, wherein the array is disposed in the reflected beam; and wherein the screen is disposed in the second transmitted beam.

13. The system of claim 1, wherein the array is disposed in the transmitted beam; and wherein the screen is disposed in the second reflected beam.

14. The system of claim 1,
wherein the arrangement of elements has a period less than approximately 0.21 microns,
wherein the elements have a thickness between approximately 0.04 to 0.5 microns, and
wherein the elements have a width of between approximately 30 to 76% of the period.

15. The system of claim 1, wherein the elements each have a cross section with a base, a top opposite the base, and opposite left and right sides; and wherein the sides form an angle with respect to the base greater than approximately 68 degrees.

16. An image projection system comprising:
a light source producing a visible light beam having a wavelength between approximately 0.4 and 0.7 microns;
a polarizing beam splitter located near the light source in the light beam and oriented at an angle with respect to the light beam, the beam splitter comprising
a transparent substrate having a surface located in the light beam with the light beam striking the surface at an angle, and
a generally parallel arrangement of thin, elongated elements supported by the substrate, the arrangement being configured and the elements being sized to interact with electromagnetic waves of the source light beam to generally (i) transmit light through the elements which has a polarization oriented perpendicular to a plane that includes at least one of the elements and the direction of the incident light beam, defining a transmitted beam, and (ii) reflect light from the elements which has a polarization oriented parallel with the plane that includes at least one of the elements and the direction of the incident light beam, defining a reflected beam;
a reflective array located near the polarizing beam splitter in the reflected beam, the array modulating the polarization of the reflected beam by selectively altering the polarization of the reflected beam to encode image information thereon and creating a modulated beam, the array being oriented to direct the modulated beam back to the polarizing beam splitter;
the polarizing beam splitter further being located in the modulated beam and oriented at an angle relative to the modulated beam, the arrangement of elements of the beam splitter interacting with electromagnetic waves of the modulated beam to generally (i) transmit light through the elements which has a polarization oriented perpendicular to a plane that includes at least one of the elements and the direction of the incident light beam, defining a transmitted beam, and (ii) reflect light from the elements which has a polarization parallel with the plane that includes at least one of the elements and the direction of the incident light beam, to separate out the unaltered polarization from the modulated beam; and
a screen disposed in the transmitted beam for displaying the encoded image information.

17. The system of claim 16, wherein the beam splitter is oriented with respect to the light beam or the modulated beam at an incident angle between approximately 0 to 80 degrees.

18. The system of claim 16, wherein the light beam has a divergence cone with a useful half angle between approximately 12 and 25°.

19. The system of claim 16, wherein the beam splitter is used at an F-number less than approximately f/2.5.

20. The system of claim 16, wherein the beam splitter has a throughput for the light beam of at least 65%, defined by the product of the fractional amount of reflected light and the fractional amount of transmitted light; and wherein the fractional amount of reflected light or the fractional amount of the transmitted light of the modulated beam is greater than approximately 0.67.

21. The system of claim 16,
wherein the arrangement of elements has a period less than approximately 0.21 microns,
wherein the elements have a thickness between approximately 0.04 to 0.5 microns, and
wherein the elements have a width of between approximately 30 to 76% of the period.

22. An image projection system comprising:
a light source producing a visible light beam having a wavelength between approximately 0.4 and 0.7 microns;
a polarizing beam splitter located near the light source in the light beam and oriented at an angle with respect to the light beam, the beam splitter comprising
a transparent substrate having a surface located in the light beam with the light striking the surface at an angle, and
a generally parallel arrangement of thin, elongated elements supported by the substrate, the arrangement being configured and the elements being sized to interact with electromagnetic waves of the source light beam to generally (i) transmit light through the elements which has a polarization oriented perpendicular to the plane that includes at least one of the elements and the direction of the incident light beam, defining a transmitted beam, and (ii) reflect light from the elements which has a polarization oriented parallel with the plane that includes at least one of the elements and the direction of the incident light beam;
a reflective array located near the polarizing beam splitter in the transmitted beam, the array modulating the polarization of the transmitted beam by selectively altering the polarization of the transmitted beam to encode image information thereon and creating a modulated beam, and being oriented to direct the modulated beam back to the beam splitter;
the polarizing beam splitter further being located in the modulated beam and oriented at an angle with respect to the modulated beam, the arrangement of elements of the beam splitter interacting with electromagnetic waves of the modulated beam to generally (i) transmit light through the elements which has a polarization oriented perpendicular to a plane that includes at least one of the elements and the direction of the incident light beam, and (ii) reflect light from the elements which has a polarization parallel with the plane that includes at least one of the elements and the direction of the incident light beam, defining a reflected beam, to separate the altered polarization from the unaltered polarization in the modulated beam, thereby extracting the image information in the modulated beam; and a screen located in the reflected beam for displaying the extracted image information in the modulated beam.

23. The system of claim 22, wherein the beam splitter is oriented with respect to the light beam or the modulated beam at an incident angle between approximately 0 to 80 degrees.

24. The system of claim 22, wherein the light beam has a divergent cone with a useful half angle between approximately 12 and 25°.

25. The system of claim 22, wherein the beam splitter is used at an F-number less than approximately f/2.5.

26. The system of claim 22, wherein the beam splitter has a throughput for the light beam of at least 65%, defined by the product of the fractional amount of reflected light and the fractional amount of transmitted light; and wherein the fractional amount of reflected light or the fractional amount of transmitted light is greater than approximately 0.67.

27. The system of claim 22,
wherein the arrangement of elements has a period less than approximately 0.21 microns,
wherein the elements have a thickness between approximately 0.04 to 0.5 microns, and
wherein the elements have a width of between approximately 30 to 76% of the period.

28. A method for projecting an image, the method comprising:
producing a source light beam having a wavelength in a range between approximately 0.4 to 0.7 microns using a light source;
substantially separating the polarizations of the source light beam using a polarizing beam splitter disposed in the source light beam, the polarizing beam splitter comprising
a generally parallel arrangement of thin, elongated elements configured and sized to interact with electromagnetic waves of the source light beam to generally (i) transmit light through the elements which has a polarization oriented perpendicular to a plane that includes at least one of the elements and the direction of the incident light beam, defining a transmitted beam, and (ii) reflect light from the elements which has a polarization orientation that lies in the plane that includes at least one of the elements and the direction of the incident light beam, defining a reflected beam;
modulating either the transmitted or reflected beam and creating a modulated beam by selectively altering the polarization of the beam using an array disposed in either the transmitted or reflected beam;
substantially separating the polarizations of the modulated beam using the polarizing beam splitter disposed in the modulated beam, the elements interacting with electromagnetic waves of the modulated beam to generally (i) transmit light through the elements which has a polarization oriented perpendicular to plane that includes at least one of the elements and the direction of the incident light beam, defining a second transmitted beam, and (ii) reflect light from the elements which has a polarization orientation that lies in the plane that includes at least one of the elements and the direction of the incident light beam, defining a second reflected beam; and displaying either the second transmitted beam or the second reflected beam on a screen.

29. An image display system for producing a visible image, the system comprising:
a light source for emitting a source light beam having a wavelength in a range between approximately 0.4 to 0.7 microns;
a liquid crystal array positioned and oriented for receiving and modulating at least a portion of the source light beam and creating a modulated beam, the modulated beam containing image information;
a screen positioned and oriented for receiving and displaying at least a portion of the modulated beam; and
a polarizing beam splitter disposed in both the source light beam and the modulated beam, the beam splitter being used at an F-number less than approximately f/2.5, the polarizing beam splitter comprising
a generally parallel arrangement of thin, elongated elements configured and sized to interact with electromagnetic waves of the source light beam to generally (i) transmit light through the elements which has a polarization oriented perpendicular to a plane that includes at least one of the elements and the direction of the incident light beam, defining a transmitted beam, and (ii) reflect light from the elements which has a polarization orientation that lies in the plane that includes at least one of the elements and the direction of the incident light beam, defining a reflected beam, and interacts with the electromagnetic waves of the modulated beam to generally (i) transmit light through the elements which has a polarization oriented perpendicular to a plane that includes at least one of the elements and the direction of the modulated light beam, defining a second transmitted beam, and (ii) reflect light from the elements which has a polarization orientation that lies in the plane that includes at least one of the elements and the direction of the modulated light beam, defining a second reflected beam; and
wherein the beam splitter is oriented with respect to the source light beam at an angle of incidence between approximately 10 to 80 degrees.

30. The system of claim 29,
wherein the arrangement of elements has a period less than approximately 0.21 microns,
wherein the elements have a thickness between approximately 0.04 to 0.5 microns, and
wherein the elements have a width of between approximately 30 to 76% of the period.

31. The system of claim 29, wherein the array is disposed in the reflected beam, and wherein the screen is disposed in the second transmitted beam.

32. The system of claim 29, wherein the array is disposed in the transmitted beam, and wherein the screen is disposed in the second reflected beam.

* * * * *